US011350695B2

(12) United States Patent
Luedecke

(10) Patent No.: US 11,350,695 B2
(45) Date of Patent: Jun. 7, 2022

(54) COMPONENTS FOR ARTICLES AND METHODS OF MAKING COMPONENTS FROM EMBROIDERED BEADS

(71) Applicant: Under Armour, Inc., Baltimore, MD (US)

(72) Inventor: Tom Luedecke, Portland, OR (US)

(73) Assignee: Under Armour, Inc., Baltimore, MD (US)

(*) Notice: Subject to any disclaimer, the term of this patent is extended or adjusted under 35 U.S.C. 154(b) by 186 days.

(21) Appl. No.: 16/551,267

(22) Filed: Aug. 26, 2019

(65) Prior Publication Data

US 2021/0059349 A1 Mar. 4, 2021
US 2021/0186149 A9 Jun. 24, 2021

Related U.S. Application Data

(62) Division of application No. 15/795,480, filed on Oct. 27, 2017, now Pat. No. 10,441,026.

(60) Provisional application No. 62/443,527, filed on Jan. 6, 2017.

(51) Int. Cl.
*A43B 13/12* (2006.01)
*A43B 13/04* (2006.01)
*A43B 13/18* (2006.01)
*A43B 13/42* (2006.01)

(52) U.S. Cl.
CPC .......... *A43B 13/127* (2013.01); *A43B 13/04* (2013.01); *A43B 13/187* (2013.01); *A43B 13/188* (2013.01); *A43B 13/42* (2013.01)

(58) Field of Classification Search
CPC ..... A43B 13/127; A43B 13/42; A43B 13/187; A43B 13/188; A43B 13/04; A43B 13/14; A43B 13/12; A43B 13/122; A43B 17/003; A43B 17/14; A43B 7/146; A43B 13/125; B32B 3/18; B32B 2437/02
USPC ......................................................... 36/141
See application file for complete search history.

(56) References Cited

U.S. PATENT DOCUMENTS

| | | | |
|---|---|---|---|
| 3,797,138 A | 3/1974 | Closson, Jr. | |
| 5,150,490 A | 9/1992 | Busch et al. | |
| 5,392,534 A | 2/1995 | Grim | |
| 5,753,061 A * | 5/1998 | Rudy | A42B 3/121 156/147 |
| 6,589,891 B1 | 7/2003 | Rast | |
| 6,971,193 B1 | 12/2005 | Potter et al. | |
| 7,504,145 B2 | 3/2009 | Vance et al. | |
| 7,662,468 B2 | 2/2010 | Bainbridge | |
| 8,845,944 B2 | 9/2014 | Sills et al. | |
| 9,243,104 B2 | 1/2016 | Watkins et al. | |
| 9,301,576 B2 | 4/2016 | Miller et al. | |

(Continued)

FOREIGN PATENT DOCUMENTS

WO 2018/129144 A1 7/2018

OTHER PUBLICATIONS

International Search Report and Written Opinion dated Mar. 26, 2018 for International Application No. PCT/US2018/12326.

*Primary Examiner* — Khoa D Huynh
*Assistant Examiner* — Haley A Smith
(74) *Attorney, Agent, or Firm* — Plumsea Law Group, LLC

(57) ABSTRACT

Beads may be stitched to a substrate layer and then fused to form structures including foam midsoles, foam pads, and other foam structures. Beads may be embroidered to multiple substrate layers and then folded or stacked together to form a preform used in a mold to form a midsole.

20 Claims, 14 Drawing Sheets

(56) References Cited

U.S. PATENT DOCUMENTS

| | | | |
|---|---|---|---|
| 10,441,026 B2* | 10/2019 | Luedecke | A43B 1/00 |
| 2005/0009429 A1 | 1/2005 | Park et al. | |
| 2005/0116380 A1* | 6/2005 | Tadin | A63B 60/00 |
| | | | 264/223 |
| 2005/0150132 A1* | 7/2005 | Iannacone | A43B 7/146 |
| | | | 36/11.5 |
| 2008/0005856 A1 | 1/2008 | Hung | |
| 2009/0007313 A1 | 1/2009 | Boorsma et al. | |
| 2009/0313853 A1* | 12/2009 | Tadin | B32B 5/26 |
| | | | 36/91 |
| 2010/0107443 A1* | 5/2010 | Aveni | A43C 1/00 |
| | | | 36/84 |
| 2011/0099845 A1* | 5/2011 | Miller | A43B 7/1465 |
| | | | 36/91 |
| 2011/0252670 A1 | 10/2011 | Smith | |
| 2011/0283560 A1* | 11/2011 | Portzline | A43B 13/186 |
| | | | 36/31 |
| 2012/0117702 A1* | 5/2012 | King | A41B 17/005 |
| | | | 2/2.16 |
| 2013/0291409 A1* | 11/2013 | Reinhardt | A43B 13/188 |
| | | | 36/30 R |
| 2014/0007456 A1 | 1/2014 | Tadin | |
| 2014/0275306 A1* | 9/2014 | Watkins | C08J 9/009 |
| | | | 521/137 |
| 2016/0058119 A1 | 3/2016 | Dyer et al. | |
| 2016/0095378 A1 | 4/2016 | Kriegel | |
| 2016/0113802 A1 | 4/2016 | Zaccaria | |
| 2016/0235158 A1* | 8/2016 | DesJardins | A43B 13/20 |
| 2016/0278481 A1* | 9/2016 | Le | A43B 7/1435 |
| 2016/0311993 A1 | 10/2016 | Zhang et al. | |
| 2017/0172254 A1* | 6/2017 | Aveni | A43B 23/0205 |
| 2017/0332733 A1 | 11/2017 | Cluckers et al. | |
| 2018/0055144 A1* | 3/2018 | Bischoff | A43B 13/206 |
| 2018/0168284 A1* | 6/2018 | Robertson | A43B 13/141 |
| 2018/0192736 A1* | 7/2018 | Luedecke | A43B 23/0255 |
| 2018/0195235 A1* | 7/2018 | Luedecke | A43B 23/0255 |
| 2018/0345576 A1* | 12/2018 | Constantinou | B29C 64/264 |
| 2019/0126580 A1* | 5/2019 | Paulson | A43B 13/187 |
| 2020/0068988 A1* | 3/2020 | Hsiao | A43B 7/125 |

* cited by examiner

US 11,350,695 B2

COMPONENTS FOR ARTICLES AND METHODS OF MAKING COMPONENTS FROM EMBROIDERED BEADS

REFERENCE TO RELATED APPLICATIONS

This application is a division of U.S. application Ser. No. 15/795,480, filed on Oct. 27, 2017 and entitled "Components for Articles and Methods of Making Components from Embroidered Beads", which application is a non-provisional patent application that claims priority to Luedecke, U.S. Provisional Application Ser. No. 62/443,527, which was filed in the U.S. Patent and Trademark Office on Jan. 6, 2017 and entitled "Articles with Embroidered Beads and Methods of Making", the disclosures of which applications are entirely incorporated herein by reference.

BACKGROUND

Embroidery is a traditional method of decorating, tailoring, mending, patching, or reinforcing textile materials by sewing with a needle and stitching material. Hand-embroidered goods date back as late as the Warring States period in China. During the industrial revolution, the invention of the sewing machine and dedicated embroidery machines expanded the use of the technique. Modern embroidery techniques may utilize machine-readable code to autonomously create an embroidery pattern on a sheet of textile materials. Textile materials include fabrics such as cotton, wool or silk, as well as leather, foam, polymer sheets, and synthetic equivalents. On the textile materials, a number of stitch techniques (such as the chain stitch, the buttonhole or blanket stitch, the running stitch, the satin stitch, or the cross stitch) may be used depending on the purpose of the embroidery. The stitching techniques may be used in combination to form a variety of set patterns. The stitching patterns may be decorative, for example, the pattern may form a flower or series of flowers. Alternatively, the stitching may be structural, such as stitching along the edges of a garment to reinforce the seams. In further cases, the stitching may be both decorative and functional, such as the use of a floral pattern used to reinforce a patch.

Typically, a thread or yarn is used as the stitching material and stitched into the textile. Commonly, the thread or yarn may be made of cotton or rayon, as well as traditional materials like wool, linen, or silk. However, embroidery may also sew in dissimilar materials to the textile, usually for decorative purposes. For example, thread created out of precious metals such as gold or silver may be embroidered within more traditional fabrics such as silk. Additional elements (such as beads, quills, sequins, pearls or entire strips of metal) may be sewn in during embroidery. These elements may be sewn in along with yarn or thread using a variety of stitching techniques, depending on the desired placement of the elements.

BRIEF DESCRIPTION OF THE DRAWINGS

The embodiments can be better understood with reference to the following drawings and description. The components in the figures are not necessarily to scale, with emphasis instead being placed upon illustrating the principles of the embodiments. Moreover, in the figures, like reference numerals designate corresponding parts throughout the different views.

DETAILED DESCRIPTION

The embodiments are related to the application of one or more sequins to an article. As used herein, the term "article" refers broadly to articles of footwear, articles of apparel (e.g., clothing), as well as accessories and/or equipment. Articles of footwear include, but are not limited to, hiking boots, soccer shoes, football shoes, sneakers, running shoes, cross-training shoes, rugby shoes, basketball shoes, baseball shoes as well as other kinds of shoes. Moreover, in some embodiments, components may be configured for various kinds of non-sports-related footwear, including, but not limited to, slippers, sandals, high-heeled footwear, loafers as well as any other kinds of footwear. Articles of apparel include, but are not limited to, socks, pants, shorts, shirts, sweaters, undergarments, hats, gloves, as well as other kinds of garments. Accessories include scarves, bags, purses, backpacks, as well as other accessories. Equipment may include various kinds of sporting equipment including, but not limited to, bats, balls, various sporting gloves (e.g., baseball mitts, football gloves, ski gloves, etc.), golf clubs, as well as other kinds of sporting equipment.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

For the purposes of general reference, an article is any item designed to be worn by or on a user, or act as an accessory. In some embodiments, an article may be an article of footwear, such as a shoe, sandal, boot, etc. In other embodiments, an article may be an article of apparel, such as a garment, including shirts, pants, jackets, socks, undergarments, or any other conventional item. In still other embodiments, an article may be an accessory such as a hat, glove, or bag worn by the wearer.

Figure 1:
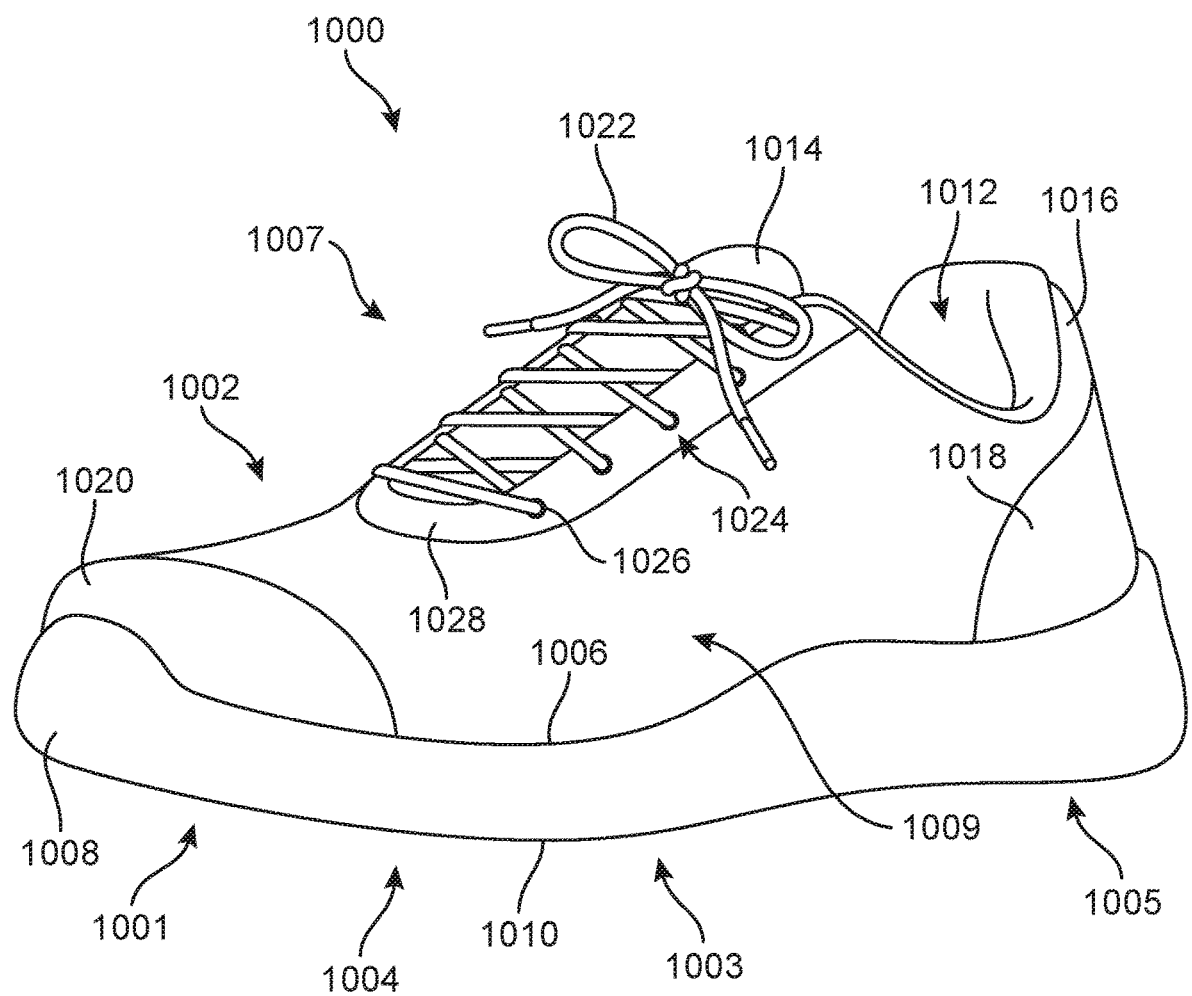
FIG. 1 is a schematic view of an exemplary embodiment of article of footwear.

For purposes of general reference, as illustrated in FIG. 1 article of footwear 1000 may be divided into three regions: forefoot region 1001, midfoot region 1003, and heel region 1005. Forefoot region 1001 may be generally associated with the toes and joints connecting the metatarsals with the phalanges. Midfoot region 1003 may be generally associated with the arch of a foot, including the instep. Likewise, heel region 1005 or "hindfoot" may be generally associated with the heel of a foot, including the calcaneus bone. For purposes of this disclosure, the following directional terms, when used in reference to an article of footwear, shall refer to the article of footwear when sitting in an upright position, with the sole facing the ground, that is, as it would be positioned when worn by a wearer standing on a substantially level surface.

The term "longitudinal," as used throughout this detailed description and in the claims, refers to a direction extending along the length of a component. For example, a longitudinal direction of an article of footwear extends from forefoot region 1001 to heel region 1003 of article of footwear 1000. The term "forward" or "front" is used to refer to the general direction in which the toes of a foot point, and the term "rearward" or "back" is used to refer to the opposite direction, i.e., the direction in which the heel of the foot is facing.

The term "lateral direction," as used throughout this detailed description and in the claims, refers to a side-to-side direction extending along the width of a component. In other words, the lateral direction may extend between medial side 1007 and lateral side 1009 of article of footwear 1000, with lateral side 1009 of article of footwear 1000 being the surface that faces away from the other foot, and medial side 1007 being the surface that faces toward the other foot.

The term "vertical," as used throughout this detailed description and in the claims, refers to a direction generally perpendicular to both the lateral and longitudinal directions. For example, in cases where an article of footwear is planted flat on a ground surface, the vertical direction may extend from the ground surface upward. It will be understood that each of these directional adjectives may be applied to individual components of an article of footwear. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The term "side," as used in this specification and in the claims, refers to any portion of a component facing generally in a lateral, medial, forward, or rearward direction, as opposed to an upward or downward direction. The term "lateral side" refers to any component facing in general toward the lateral direction. The term "medial side" refers to any component facing in general toward the medial direction.

It will be understood that the forefoot region, the midfoot region, and the heel region are only intended for purposes of description and are not intended to demarcate precise regions of an article of footwear. For example, in some cases, one or more of the regions may overlap. Likewise, the medial side and the lateral side are intended to represent generally two sides, rather than precisely demarcating an article of footwear into two halves. In addition, the forefoot region, the midfoot region, and the heel region, as well as the medial side and the lateral side, may also be applied to individual components of an article of footwear, including a sole structure, an upper, a lacing system, and/or any other component associated with the article.

Article of footwear 1000 may include upper 1002 and sole or "sole structure" 1004, which define an internal cavity between the upper and sole. The "interior" of an article of footwear refers to space in this internal cavity that is occupied by a wearer's foot when the article of footwear is worn. The "inner side" or "inside" of an element refers to the face of that element that is (or will be) oriented toward the internal cavity in a completed article of footwear. The "outer side," "outside," or "exterior" of an element refers to the face of that element that is (or will be) oriented away from the internal cavity in the completed article of footwear 1000. In some cases, the inner side of an element may have other elements between that inner side and the interior in the completed article of footwear 1000. Similarly, an outer side of an element may have other elements between that outer side and the space external to the completed article of footwear 1000. Further, the terms "inward" and "inwardly" shall refer to the direction toward the interior of the article of footwear, and the terms "outward" and "outwardly" shall refer to the direction toward the exterior of article of footwear 1000.

Upper 1002 provides a covering for the wearer's foot that comfortably receives and securely positions the foot with respect to the sole structure. Upper 1002 may be made from any suitable material or pluralities of materials including, but not limited to, nylon, cotton, natural leather, synthetic leather, natural rubber, or synthetic rubber. In general, upper 1002 includes opening 1012 that provides entry for the foot into an interior cavity of upper 1002 in heel region 1005. Upper 1002 may be of a variety of styles depending on factors such as desired use and required ankle mobility. For example, an athletic shoe with upper 1002 having a "low-top" configuration extending below the ankle that is shaped to provide high mobility for an ankle. However, upper 1002 could be configured as a "high-top" upper extending above the wearer's ankle for basketball or other activities, or as a "mid-top" configuration extending to about the wearer's ankle. Furthermore, upper 1002 may also include non-athletic shoes, such as dress shoes, loafers, sandals, and work boots. Upper 1002 may also include tongue 1014 that provides cushioning and support across the instep of the foot. Upper 1002 may also include collar 1016 within opening 1012, collar 1016 may include an elastomeric or tacky material to allow the opening to stretch and conform to the wearer's ankle. Upper 1002 may include heel counter 1018. Heel counter 1018 may be disposed over upper 1002's outer surface or within the upper on upper 1002's interior surface. Upper 1002 may also include other known features in the art, including heel tabs, loops, etc. Furthermore, upper 1002 may include toe cage or box 1020 in the forefront region. Even further, upper 1002 may include logos, trademarks, and instructions for care. Upper 1002, and the components for upper 1002, may be manufactured from conventional materials (e.g., woven or nonwoven textiles, leather, synthetic leather, rubber, polymer foams, etc.). The specific materials utilized are generally selected to impart wear-resistance, flexibility, air-permeability, moisture control, and comfort to the article of footwear.

Upper 1002 may include a fastening provision on a fastening region of the upper. For example, the fastening provision may be lacing system 1022, or "lace" applied at a fastening region of upper 1002. Other embodiments of fastening provisions, include, but are not limited to, laces, cables, straps, buttons, zippers as well as any other provisions known in the art for fastening articles. For a lacing system, the fastening region comprises plurality of eyelets 1024 on the upper, which is comprised of a series of individual eyelets 1026 on medial side 1007 and lateral side 1009 of upper 1002 extending up to collar 1016 in upper 1002. Additionally, the lacing system may include lace cage 1028. In other embodiments, the fastening region may comprise one or more tabs, loops, hooks, D-rings, hollows, or any other provisions known in the art for fastening regions.

Sole structure 1004 is positioned between a foot of a wearer and the ground, and may incorporate various component elements. For example, sole structure 1004 may include one or more of inner sole component or "insole" 1006, a middle sole element or "midsole" 1008, and an outer sole element or "outsole" 1010. Insole 1006 may take the form of a sockliner adjacent the wearer's foot to provide a comfortable contact surface for the wearer's foot. It will be understood that an insole may be optional. Further, midsole 1008 may directly serve as a cushion and support for the foot. In addition, outsole 1010 may be configured to contact the ground surface. Insole 1006, midsole 1008, and outsole 1010 may be assembled together with insole 1006, forming the interior of sole structure 1004, while outsole 1010 forms the exterior. Insole 1006, midsole 1008, and outsole 1010 may be combined into a single structure. Upper 1002 and sole structure 1004 may be coupled using any conventional or suitable manner, such as adhesion or bonding, via a woven connection, via one or more types of fasteners, etc. Additionally, sole structure 1004 and upper 1002 may be combined together in a single unitary construction.

Sole structure 1004 may contact a ground surface and have various features to deal with the ground surface. Examples of ground surfaces include, but are not limited to, indoor ground surfaces (such as wood and concrete floors), pavement, natural turf, synthetic turf, dirt, as well as other surfaces. In some cases, the lower portions of sole structure 1004 may include provisions for traction, including, but not limited to, traction elements, studs, and/or cleats. In some cases, outsole 1010 is secured to a lower surface of midsole 1008. It will be understood that in other embodiments, outsole 1010 may be optional. For example, midsole 1008 may be configured to contact the ground surface directly. Furthermore, midsole 1008 could be provided with various traction elements, studs, and/or cleats to contact the ground surface. Additionally, portions of both midsole 1008 and outsole 1010 can be configured to contact a ground surface.

Sole structure 1004 may be made of a variety of any suitable material or pluralities of materials for a variety of functions. For example, one or more components of sole structure 1004, such as the midsole, may be formed from a polymer foam (e.g., a polyurethane or ethylvinylacetate foam) material that attenuates ground-reaction forces (i.e., provides cushioning) during walking, running, and other ambulatory activities. In addition, the components of a sole may also include gels, fluid-filled chambers, plates, moderators, inserts, or other elements that further attenuate forces, enhance stability, or influence the motions of the foot. In addition, the other components may have specific surface properties, such as an outsole being made from a durable material, such as carbon or blown rubber, which is further textured to impart traction. Furthermore, the insole may be made from a waterproof material such as a synthetic like ethylvinylacetate to prevent moisture from seeping into the sole.

Dissimilar materials described herein may be attached by fusing or welding. As utilized herein, the terms "fusing" and "welding" (and variants thereof) are defined as a securing technique between two elements that involves a softening or melting of the material of at least one of the elements such that the materials of the elements are secured to each other when cooled. Similarly, the term "weld," or variants thereof, is defined as the bond, link, or structure that joins two elements through a process that involves a softening or melting of material within at least one of the elements such that the elements are secured to each other when cooled. Welding may involve the melting or softening of two components such that the materials from each component intermingle with each other, that is, the materials may diffuse across a boundary layer (or "heat-affected zone") between the materials, and are secured together when cooled. Alternatively, welding may involve the melting or softening of a material in a first component such that the material extends into or infiltrates the structure of a second component, for example, infiltrating crevices or cavities in the second component or extending around or bonding with filaments or fibers in the second component to secure the components together when cooled. Thus, welding of two components together may occur when material from one or both of the components melts or softens. Accordingly, a weldable material, such as a polymer material, may be provided in one or both of the components. Additionally, welding does not generally involve the use of stitching or adhesives, but involves directly bonding components to each other with heat. In some situations, however, stitching or adhesives may be utilized to supplement the weld or the joining of the components through welding. Components that have been welded together will be understood to be "fused" together.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" shall refer to the joining of two components in a manner such that the two components are secured together but may be readily detached from one another. Examples of removable attachment mechanisms may include hook and loop fasteners, friction fit connections, interference fit connections, threaded connectors, cam-locking connectors, and other such readily detachable connectors. Similarly, "removably disposed" shall refer to the assembly of two components in a non-permanent fashion.

The term "strand" includes a single fiber, filament, or monofilament, as well as an ordered assemblage of textile fibers having a high ratio of length to diameter and normally used as a unit (e.g., slivers, roving, single yarns, plies yarns, cords, braids, ropes, etc.).

The term "fiber" as used herein refers to a fundamental component used in the assembly of yarns and fabrics. Generally, a fiber is a component that has a length dimension that is much greater than its diameter or width. This term includes ribbon, strip, staple, and other forms of chopped, cut or discontinuous fiber and the like having a regular or irregular cross section. "Fiber" also includes a plurality of any one of the above or a combination of the above. Examples of materials that may be utilized include cotton, polyester, nylon, polypropylene, polyethylene, acrylics, wool, acetate, polyacrylonitrile, and combinations thereof. Natural fibers also include cellulosic fibers (e.g., cotton, bamboo) or protein fibers (e.g., wool, silk, and soybean).

The term "filament" as used herein refers to a fiber of indefinite or extreme length such as found naturally in silk. This term also refers to manufactured fibers produced by, among other things, extrusion processes. Individual filaments making up a fiber may have any one of a variety of cross sections that include round, serrated or crenular, bean-shaped or others.

The term "yarn" as used herein refers to a continuous strand of textile fibers, filaments, or material in a form suitable for weaving, or otherwise intertwining to form a textile fabric. Yarn can occur in a variety of forms that include a spun yarn containing staple fibers usually bound together by twist; a multi-filament yarn containing many continuous filaments or strands; or a mono-filament yarn, which consists of a single strand.

The term "composite yarn" refers to a yarn prepared from two or more yarns (or "ends"), which can be the same or different. Composite yarn can occur in a variety of forms wherein the two or more ends are in differing orientations relative to one another, so long as the final composite yarn containing the two or more ends is stably assembled (i.e., will remain intact unless forcibly separated or disassembled). The two or more ends can, for example, be parallel, wrapped one around the other(s), twisted together, or combinations of any or all of these, as well as other orientations, depending on the properties of the composite yarn desired.

Figure 2:
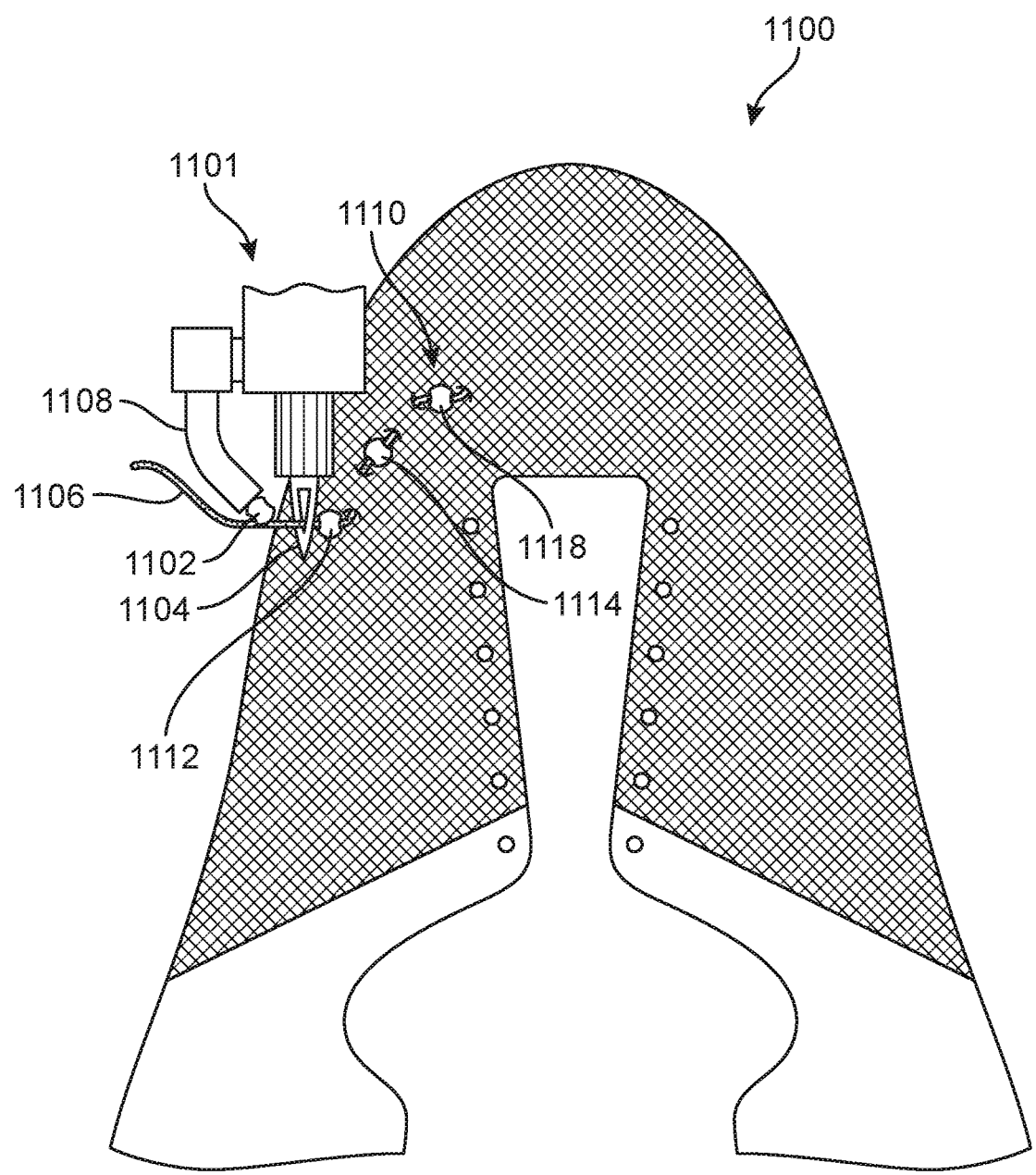
FIG. 2 is a schematic view of an exemplary embodiment of a method of embroidering beads on to an article of apparel.

FIG. 2 demonstrates an exemplary embodiment of a method of embroidering beads on to a wearable article 1100, also known as "the article" or "article of apparel" or article 1100. In some embodiments, the article may be an article of footwear, or an element of an article of footwear, such as the upper. In other embodiments, the article may be a garment or clothing, such as pants, socks, shirts, jackets, dresses, skirts, underwear, brassieres, supportive athletic garments, shorts, vests, or any other form of clothing known in the art. In still other embodiments, the article may be an accessory worn by a user such as hats, gloves, and bags, or any other accessory known in the art. In yet another embodiment, a backer plate may be used to form the outline of the article. In the specific illustrated example of FIG. 2, article 1100 is upper 1002 of article of footwear 1000.

Article 1100 includes at least an element made of a textile. In some embodiments, the textile is a fabric made of material such as silk, wool, or cotton. In other embodiments, the textile is made of synthetic equivalents, such as polyvinyl acetate (PVA), thermoplastic polyurethane (TPU), or ethylene vinyl acetate (EVA). In general, a fabric comprises a series of yarns, fibers, filaments, or strands in a networked pattern made by weaving, knitting, spreading, crocheting, or bonding the yarns, fibers, filaments, or strands together. In still other embodiments, the textile may be leather, foam, synthetic equivalents of leather, or single sheet materials such as plastic or vinyl sheets. In still further embodiments, article 1100 may be a backing layer comprising of a material able to dissolve or melt as needed, such as TPU, PVA, or EVA.

In bead embroidery, a bead is sewn to the textile (or any other substrate layer) using a thread and needle to stitch a bead to the textile element of the article 1100 as illustrated in an exemplary embodiment in FIG. 2. As illustrated by FIG. 2, bead 1102 may be embroidered by sewing bead 1102 with needle 1104 and thread 1106 to the textile element of article 1100. Thread 1106 may be any form of strand, yarn, fiber filament, or strand mentioned herein including materials such as PVA, EVA, or TPU. Needle 1104 may be a hand needle, or machine needle. In some embodiments, the embroidery is done using embroidery machine 1101. In some embodiments, the machine and method of embroidering is as discussed by Kurihara, U.S. Pat. No. 5,481,993, issued Jan. 9, 1996, and titled "Method and Apparatus for Embroidering Beads"; or as discussed by Sik, Korean Patent Number 100799759, issued Feb. 2, 2008, and titled "Bead Feeding Device for Embroidery Machine"; or as discussed in Jiangming et al., Chinese Patent Number 203439704, issued Feb. 19, 2014, and titled "Bead Diamond Embroidery Machine," the entirety of each these applications being herein incorporated by reference.

The embodiments may generally use any of the methods, techniques, processes, systems, machines, and/or equipment disclosed in Berns et al., U.S. Patent Application Publication Number 2016/0316856, published Nov. 3, 2016, and titled "Footwear Upper Including Strand Layers"; Berns et al., U.S. Patent Application Publication Number 2016/0316855, published Nov. 3, 2016, and titled "Footwear Upper Including Variable Stitch Density"; and Berns et al., Patent Application Publication Number 2015/0272274, published Oct. 1, 2015, and titled "Footwear Including Textile Element," the entirety of each application being herein incorporated by reference.

In some embodiments, such as the illustrated embodiment of FIG. 2, embroidery machine 1101 may use continuous feed 1108 to sew plurality of beads 1110 on to article 1100. FIG. 2 is a schematic of an embroidery process, with only selected elements such as the tip of embroidery machine 1101 shown. In other embodiments, embroidery machine 1101 may use a bead hopper to feed plurality of beads 1110 on to article 1100 then sew them in place. In some embodiments, only a single type of bead is sewn using a machine. In other embodiments, multiple types of beads may be sewn at the same time using the same feeder and/or hopper. In still other embodiments, an embroidery machine may have multiple feeds and/or multiple hoppers to embroider multiple beads at the same time.

The method of stitching used to attach the bead may vary. In some embodiments, the bead is stitched via an opening in the bead. In other embodiments, the bead is stitched through the bead material. In some embodiments, embroidery machine 1101 stitches thread using needle 1104 via openings in the fabric comprising article 1100. In other embodiments, the needle creates its own opening in the article and stitches the bead and thread via the resulting holes. During the stitching process demonstrated in exemplary FIG. 2, an initial stitch pierces article 1100 or an opening in the weave of fabric of article 1100. Bead 1102 is then threaded on to thread 1106 by embroidery machine 1101 from continuous feed 1108, and secured to article 1100 by a second backer stitch closing a loop of thread 1106 through article 1100 in place to form fixed bead 1112. In some embodiments, each individual bead is individually stitched to the textile. In other embodiments, multiple beads may be stitched to the textile as a group. In still other embodiments, multiple beads may come from multiple feeds and/or multiple hoppers and be stitched together as a group. In further embodiments, multiple beads may come from multiple feeds or multiple hoppers and bead stitched together individually. In yet another embodiment, a combination of single bead stitching and multiple bead stitching may be used.

The technique of stitching the bead to the article may vary. In some embodiments, the type of stitches used may include chain stitch, double chain stitch, the buttonhole or blanket stitch, the running stitch, the satin stitch, the cross stitch, or any other stitch technique known in the art. In other embodiments, a combination of known stitch techniques may be used. In further embodiments, these techniques may be used individually or in combination to stitch either individual beads or groups of beads to the article. In still further embodiments, these techniques may be used individually or in combination to stitch a combination of individual beads and groups of beads to the article.

The stitches may form a pattern. This pattern may take the form of individual beads or groups of beads or a combination of individual beads and groups of beads. When the stitching is performed by a machine, the machine may use a computer-generated program to control the stitching, including the locations of the stitching relative to the textile, as well as how and which beads to feed, how to stitch the beads, and the technique of stitching used. In the illustrated embodiment of FIG. 2, individual beads comprising fixed bead 1112, bead 1114, and bead 1118 are sewn to article 1100 in a pattern forming a line. In other embodiments, the pattern may comprise a curve, ovals, or other geometric shapes or combination of shapes, characters such as letters or numbers, symbols such as a trademark, as well as additional patterns disclosed herein. In some embodiments, the thread may continuously stitch the article with beads being inserted only where required by the pattern. In other embodiments, the thread may be discontinuous between beads within the pattern.

Although the illustrated embodiment of FIG. 2 depicted beads embroidered directly to the upper of an article, similar methods may be used for embroidering beads to any substrate layer, including substrate layers that may be utilized to form soles and other structures, as discussed in further detail below.

In alternative embodiments, the bead may also be attached to the textile via bead crocheting, bead knitting, or bead weaving in addition to, or in place of bead embroidery, either by hand or by using a machine such as an embroidery machine.

In differing embodiments, beads may vary. The term "bead" may be known by several alternative names, such as pearls, bobbles, or even in some forms be referred to as sequins, spangles, paillettes, or diamantes. In general, a bead refers to any object pierced by a thread with the thread either passing through a material portion of the object or through a pre-formed hole or opening. In some embodiments, the beads are manufactured with a hole or aperture. In other embodiments, a hole or aperture is created by piercing or drilling the bead, such as with a needle. Commonly, beads are oval in at least one dimension, including shapes such as oviods and cylinders. However, beads may be known in any known shape including, but not limited to, cubes, rectangular prisms, tetrahedrons, and so forth.

The beads embroidered may include a variety of bead shapes, sizes, and colors. The beads' shape may be oval, hollow, cylindrical, or the beads may be bugle beads, chatons, crystal beads, gem beads, faceted beads, delica beads, seed beads, rounded beads, or any other shape known in the art. In some embodiments, the beads may take the form of microbeads with a size less than 2 mm, with sizes including 1 mm and 2 mm. In some embodiments, the beads may be larger than 2 mm. In further embodiments comprising microbeads, the microbeads may be attached to the article by stitching through the surface of the bead in addition to or in place of threading the bead. In some embodiments, microbeads may be known as high-density beads, and contain a high relative density and or hardness.

In some embodiments, the beads may be colored, using any known shade or hue by mixing in appropriate pigments to the bead material. In some embodiments, the beads may be colored after manufacturing. In some embodiments, beads with differing properties such as hardness, density, abrasion, or structural support, may be colored in distinct ways. In other embodiments, beads with differing properties such as hardness, density, abrasion, structural support, may be colored in similar ways.

The beads may be embroidered such that they are perpendicular to article 1100, or are parallel to article 1100. Perpendicular beads are threaded such that the thread within the bead is perpendicular to article 1100. Parallel beads are threaded such that the thread within the bead is parallel to article 1100. The beads may also be embroidered to the article with a combination of parallel and perpendicular beads.

A backing layer, or backer layer, may be used during the embroidery process. A backing layer, in general, provides a layer behind article 1100 to give the embroidery machine a better working surface. In some embodiments, the backing layer holds article 1100 in place. In other embodiments, the backing layer provides an inner layer for the wearer to prevent itching or abrasion. In further embodiments, the backing layer may prevent an elastic or otherwise stretchable material from distorting during processing. In some embodiments, the backing layer is permanently attached to article 1100. In other embodiments, the backing layer is removable. In still other embodiments, the backing layer may be dissolved from the article. In further embodiments, the backing layer may be melted into the article. In some embodiments, the backing layer is a single piece. In other embodiments, the backing layer requires multiple pieces, each with varying characteristics. It may be appreciated that in some cases, beads may be directly embroidered to a backing layer without any intermediate textile layer.

The material of the beads may vary. In some embodiments, the material may be of a polymer material of varying hardness such as polyvinyl acetate (PVA), thermoplastic polyurethane (TPU), polyethylene, or ethylene vinyl acetate (EVA). In other embodiments, the beads may be made of rigid materials such as ceramic or acrylic. In some embodiments, the bead may be a blend of a polymer material with an additive such as nitrile rubber, such as an EVA blend with nitrile rubber. In some embodiments, the beads may be made of a blend material such that the hardness may be controlled by the relative blend of nitrile rubber. In other embodiments, the relative hardness may be controlled by controlling the relative weight of the beads from materials including PVA, TPU, and/or EVA as well as nitrile rubber. In still other materials, a combination of bead materials may be used, including combining ceramic or acrylic beads with polymer or polymer blend beads. In some embodiments, the polymer or polymer blend material is fusible or weldable. In some embodiments, the polymer or polymer blend material is in the form of foam.

In various embodiments, the beads may be made from a foam. In certain embodiments, the beads made from a polymer or polymer blend by mixing pellets of the polymer into a bead maker, melting the pellets, and blowing the melt to form foam into the desired shape. The blown shape may be any shape known in the art. In some embodiments, the beads are not blown. In further embodiments, the beads may be blown to the same size regardless of the amount of pellets used, allowing pellet weight to control bead density as well as hardness. For example, using fewer pellets than standard may decrease the bead density and relative hardness of the bead, while using more pellets may increase the bead density and relative hardness of the bead. In further embodiments, the beads may be partially blown rather than blown to the full size. For partially blown beads, the bead may be as much as 95% blown. In other embodiments, the beads are not blown at all. In some embodiments, the beads may be blown after the melt has begun to cool, while in other embodiments the beads are melted immediately. In some embodiments, all foam beads are of identical hardness and density and of a consistent degree of blowing. In other embodiments, the foam beads may be a mixture of various hardnesses and densities as well as degree of blowing. Blowing the bead may affect the ability to melt or fuse, as well as the density and hardness.

The beads embroidered may include fusible beads such as Nabbi, Hama, Fuse, Melting, Perler, or Pyssla beads as well as their generic equivalents. Such beads, further known herein by the name "fusible beads," are generally cylindrical beads, in the shape of a bugle bead. The opening in a fusible bead is generally relatively large compared to the thickness of the bead, but may vary along with the height of the bead. However, in some embodiments, the beads may vary in shape to any other shape known in the art. Fusible beads are known as such because they may melt or fuse when thermally processed. Fusible beads may melt or "fuse" between themselves, to thread 1106, to article 1100, to an external element to the article, between two dissimilar materials when thermally processed, or any combination of two or more methods of fusing. In some embodiments, fusible beads may melt or fuse to form a glue, between each other, to the thread, to an article, or between two surfaces. Such fusible beads may be made from polymers or polymer blends including TPU, PVA, EVA, and/or nitrile rubber as well as those under the labels Nabbi, Hama, Fuse, Melting, Perler, or Pyssla beads.

Threads used for embroidery may be used from a variety of materials. For example, thread may be made of polymer materials including nylon, polyethylene, TPU, PVA, or EVA as well as Dyneema fiber made from ultra-high molecular weight polyethylene. The thread may also include a blend of polymer materials and may include nitrile rubber. The thread also may be made from more conventional materials including cotton, silk, or other natural fibers disclosed herein. The thread also may be made from any known synthetic equivalent. In some embodiments, exposing the thread to heat or pressure may cause the thread to melt or fuse. In other embodiments, exposing the thread to heat or pressure may cause the thread to dissolve. In still other embodiments, the thread may dissolve when exposed to a solvent, such as acid or water.

The materials of the articles herein may vary. Articles include at least an element made of a textile. In some embodiments, the textile is a fabric made of material such as silk, wool, or cotton. In other embodiments, the textile is made of synthetic equivalents, such as polyvinyl acetate (PVA), thermoplastic polyurethane (TPU), or ethylene vinyl acetate (EVA). In general, a fabric comprises a series of yarns, fibers, filaments, or strands in a networked pattern made by weaving, knitting, spreading, crocheting, or bonding the yarns, fibers, filaments, or strands together. In still other embodiments, the textile may be leather, foam, synthetic equivalents of leather, or single sheet materials such as plastic or vinyl sheets. In still further embodiments, an article may be a backing layer.

The materials of backing layers may vary. Backing sheets may be used as an anti-abrasion layer and may be made of a material soft to the skin, such as silk or cotton, as well as synthetics like equivalents such as nylon, or foam materials. Backing sheets may be used to prevent an article from stretching during embroidery and may be used from a harder more rigid substance, such as a sheet made from TPU, PVA, or EVA. Backing layers may also be made from a fusible material such as EV, or a dissolvable material such as TPU, PVA, or EVA. Furthermore, backing sheets may combine various materials for different purposes for different sections. For example, a rigid dissolvable backing material may be used in combination with a soft permanent backing layer.

Some embodiments may include beads comprised of materials including at least one hot melt material. A hot melt material, or hot melt adhesive material, may be any material that may be melted and is tacky when hot. Hot melt materials may be provided in solid form, then can be heated to become tacky and bond with other materials, or to bond two or more materials together as an adhesive.

Exemplary materials that may be used as part of a hot melt material include, but are not limited to, ethylene-vinyl acetates, polyolefins, polyamides and polyesters, polyurethanes, styrene block copolymers, polycarbonates, fluoropolymers, silicone rubbers, etc. In some embodiments, a hot melt material could include, or consist of, thermoplastic polyurethane (TPU). Moreover, it may be appreciated that a hot melt material could comprise various combinations of the materials listed here, as well as combinations with still other materials. The specific materials used may be selected to achieve desired properties, such as a desired glass transition temperature, degree of crystallization, melt viscosity, crystallization rate, desired level of tackiness, color, resistance to water or other solvents, as well as possibly other factors.

It may be appreciated that a hot melt material can be used as an adhesive in some cases, or as a compound that can be molded with heat in other cases. For example, in some embodiments, a hot melt can be used to form various structural elements by melting beads into a desired geometry and cooling the hot melt.

Beads can be attached to substrate materials using any of the principles, methods, systems, and teachings disclosed in any of the following applications: Kurihara, U.S. Pat. No. 5,481,993, issued Jan. 9, 1996, and titled "Method and Apparatus for Embroidering Beads," as well as Tajima et al., U.S. Patent Publication Number 2006/0011116, published Jan. 19, 2006, and titled "Sequin Feeder," the entirety of these applications being herein incorporated by reference.

Differing embodiments may utilize differing substrate layers to embroider beads as a structural component. In some embodiments, the substrate layer is an article of apparel. In other embodiments, the substrate layer is an article of footwear. In further embodiments, the substrate layer is for an accessory. In yet additional embodiments, the substrate layer is a backing layer. In some embodiments, the substrate layer is merely a portion of an article of apparel, article of footwear, accessory, and/or backing layer.

The structures and materials described herein can be used to provide additional materials and components in different embodiments. Some implementations can be configured for use in articles such as clothing accessories or articles of apparel. For example, the embodiments disclosed herein can be incorporated into any type of shirt, such as a short-sleeved shirt, a long-sleeved shirt, a t-shirt, a hooded shirt, an undershirt, a sweater, a sweat shirt, or any garment that is worn on the torso, as well as other articles of apparel, including but not limited to, jeans, pants, sweatpants, a jacket, a coat, a uniform, rain gear, a vest, outerwear, a tank top, a robe, an under garment, a necktie, suspenders, socks, shoes, boots, skippers, sandals, a scarf, a jersey, an athletic uniform, gloves, mittens, stockings, pajamas, a night shirt, a skirt, a belt, a cap, a baseball cap, a hat, a visor, a head band, a sweatband, ear muffs, bandanas, and bibs. In addition, embodiments can be utilized to form bags, purses, blankets, bedding, or other such accessories.

Furthermore, some embodiments may be configured for use in articles of footwear, for example, where some implementations may be configured to be used for various kinds of footwear including, but not limited to, hiking boots, soccer shoes, football shoes, sneakers, running shoes, cross-training shoes, rugby shoes, basketball shoes, baseball shoes as well as other kinds of shoes. Moreover, in some embodiments, components may be configured for various kinds of non-sports-related footwear, including, but not limited to, slippers, sandals, high-heeled footwear, loafers as well as any other kinds of footwear.

Figure 3:
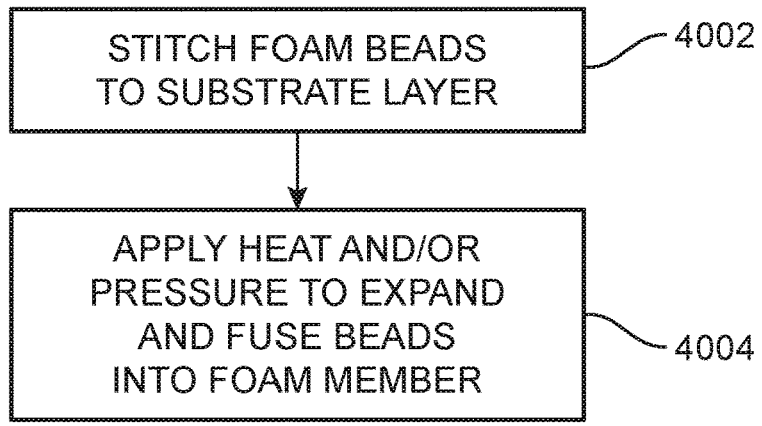
FIG. 3 is a flow chart depicting an embodiment of a method of making a foam member.

In order to further customize or individualize an article, such as an article of footwear, the present disclosure provides various methods of forming various layers, substrates, or members that can be used in articles of footwear or other articles as noted above. For example, discrete elements such as beads can be fused together to merge and form a larger structure that can be used in different types of articles of apparel, including articles of footwear. In some embodiments, a single layer of discrete beads can be deposited and fused together to form a unitary piece or continuous structure. The beads can be disposed adjacent to one another or atop of each other and then exposed to heat and/or pressure in a curing process to join the beads together. Referring to FIG. 3, first step 4002 of the present method comprises stitching a plurality of beads to a substrate layer, or substrate, forming a bead-substrate assembly. In second step 4004, the bead-substrate assembly is exposed to heat and/or pressure in order to fuse together the plurality of beads. In some embodiments, the beads can be configured to expand as they are heated or cured. As the beads are fused together, the plurality of beads can transition from a plurality of discrete elements to form a substantially continuous member in some embodiments. In one embodiment, the beads can comprise foam pellets that can be fused together to form a unitary foam member. In other embodiments, each of the beads can include a range of materials, as described earlier.

Figure 4:
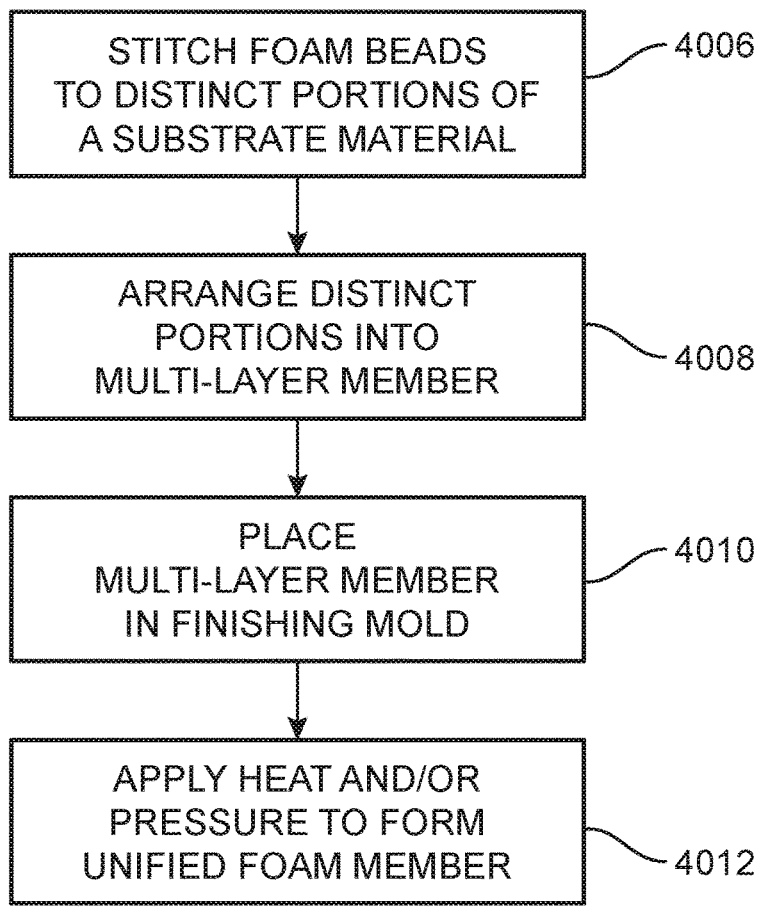
FIG. 4 is a flow chart depicting an embodiment of a method of making a multilayer foam member.

Referring to the flow chart of FIG. 4, another method of making a type of foam structure is illustrated. In first step 4006, a plurality of beads is stitched to distinct portions or regions of a substrate layer, or substrate, forming a bead-substrate assembly. In second step 4008, the distinct portions are arranged to form a multilayer member. In some cases, additional beads can be disposed or placed above at least some of the plurality of beads that were stitched to the substrate in first step 4006, forming regions with at least two layers of beads. In some embodiments, the additional beads can be stitched to a second substrate. In another embodiment, additional materials can be added to the multilayer member, adjacent to the beads or substrate, or above or below the beads. In third step 4010, the multilayer member is placed or otherwise disposed in a finishing mold. It should be understood that in some other embodiments, the bead-substrate assembly can be built or assembled directly within a finishing mold. In fourth step 4012, the multilayer member is exposed to heat and/or pressure in order to fuse together the plurality of beads and/or the substrate layer. In some embodiments, the beads can be configured to expand as they are heated. As the beads are fused together, the plurality of beads and other materials can transition or form into a unified foam member in some embodiments.

In addition, it should be understood that the various stitching and post-processing steps used with respect to the exemplary processes of FIGS. 3 and 4 can make use of any of the methods, processes, systems, devices, and/or components described previously in this application for embroidering or otherwise stitching beads to a substrate or other layer.

Figure 5:
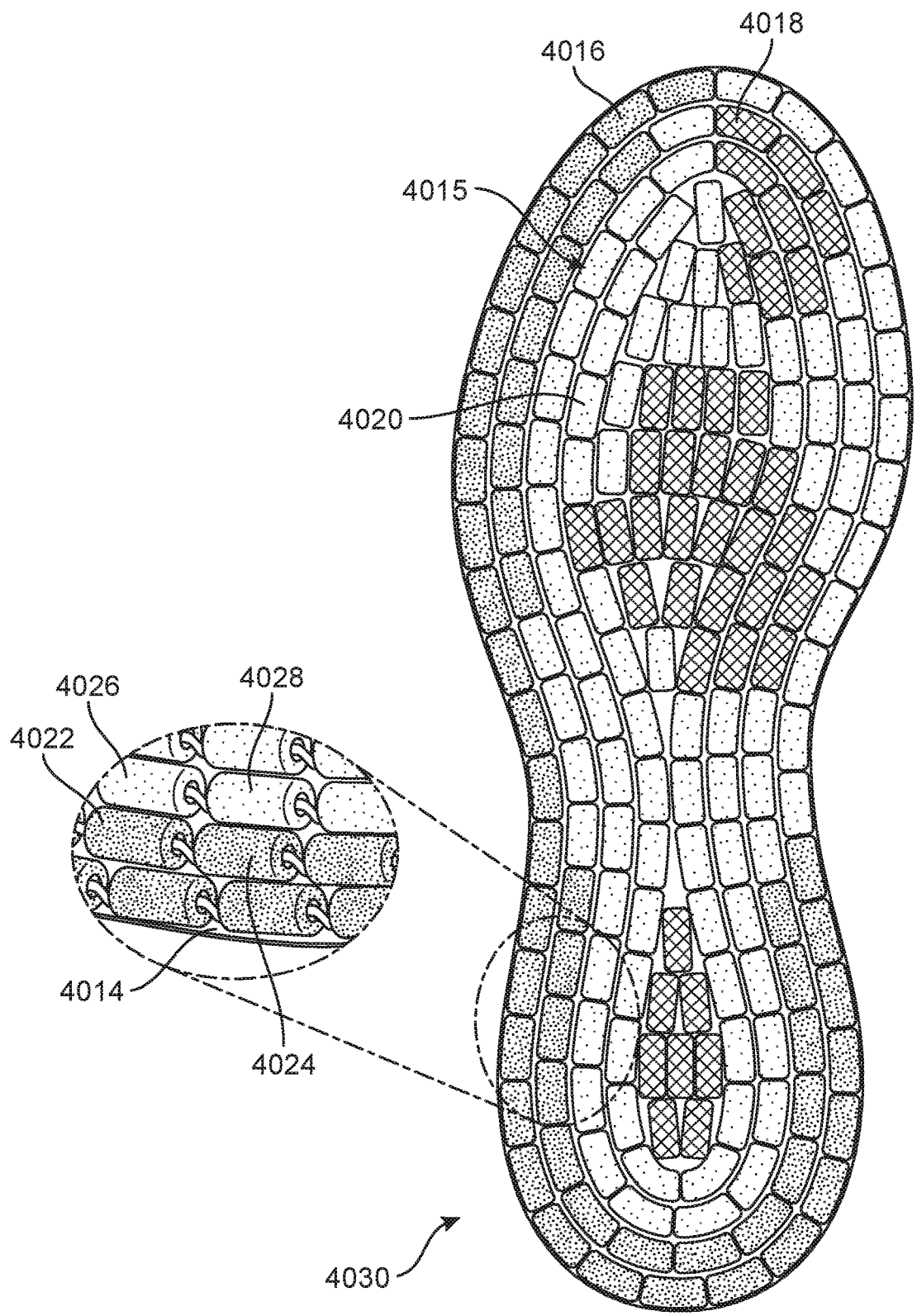
FIG. 5 is a schematic top-down view of a bead-substrate assembly, according to an embodiment.

In order to provide greater clarity with respect to the disclosed embodiments, FIGS. 5-10 illustrate some examples of the steps described above. In FIG. 5, substrate layer 4014 is shown. Substrate layer 4014 can comprise any type of material that is used to provide a foundation, support, base, underpinning, or layer upon which one or more discrete elements can be positioned. For example, in one embodiment, substrate layer 4014 can include a type of water-soluble synthetic polymer to which beads can be attached. Also shown in FIG. 5 is plurality of beads 4015. Plurality of beads 4015 can include any number or type of beads. Thus, the number of beads comprising plurality of beads 4015 can vary widely in number, and include at least one bead to hundreds or thousands of beads or more.

In FIG. 5, for purposes of reference, plurality of beads 4015 comprises first set of beads ("first bead set") 4016, second set of beads ("second bead set") 4018, and third set of beads ("third bead set") 4020. It should be understood that first bead set 4016, second bead set 4018, and third bead set 4020, etc., are indicated schematically in the figures using different kinds of fills. For purposes of simplicity, it will be understood that the beads of first bead set 4016 are substantially similar to one another, the beads of second bead set 4018 are substantially similar to one another, and the beads of third bead set 4020 are substantially similar to one another. Thus, referring to the magnified view of FIG. 5, first bead 4022 and second bead 4024 should be understood to be substantially similar in size, material composition, geometry, and other structural properties. Similarly, third bead 4026 and fourth bead 4028 are substantially similar in size, material composition, geometry, and other structural properties. However, as will be described further below, one or more beads of plurality of beads 4015 can differ also from one other. For purposes of illustration, the beads comprising first bead set 4016 differ from the beads of second bead set 4018 and/or third bead set 4020. Similarly, beads comprising second bead set 4018 can differ from beads of third bead set 4020. In other embodiments, however, plurality of beads 4015 arranged on substrate layer 4014 may consist of a substantially similar or uniform set of beads.

Thus, as noted in FIGS. 3 and 4, plurality of beads 4015 can be stitched or otherwise secured or attached to substrate layer 4014, forming bead-substrate assembly 4030. Each bead can be individually embroidered to the substrate, and additional beads can be embroidered to the same substrate, adjacent to the previously secured beads, or in a location that is spaced apart from the previously secured beads. Depending on the desired preferences, user morphology, expected use, physical needs, comfort, and other such data, the location of each individual bead placement can vary widely, as well as the selection of the individual bead and its associated properties. For example, beads with a greater hardness or rigidity can be arranged along the periphery of the substrate, while beads with a lesser hardness (or greater softness) can be arranged closer to the center of the substrate. Once the beads are selected and arranged on the substrate as desired, the bead-substrate assembly can be exposed to heat and/or pressure in order to fuse the beads together. In some embodiments, one or more beads can be pre-expanded or pre-blown to some extent, such that the expansion that occurs upon application of heat and/or pressure is not as significant but remains substantial enough to permit adequate fusing of adjacent beads.

In some implementations, a finishing mold can be utilized during manufacture (not shown). In some embodiments, the substrate can be disposed in a mold while beads are deposited upon and secured to the substrate. In other embodiments, the beads can be deposited upon and secured to the substrate, and the bead-substrate assembly, such as the one shown in FIG. 5, can be placed into a mold. Once the beads have been positioned along the substrate and the bead-substrate assembly placed in the mold, heat and/or pressure is applied. After the curing process, a single, continuous foam layer can be removed from the mold. In other words, the individual bead arrangement can transition into a continuous or unitary component layer.

As described earlier, in order to produce the bead-substrate assembly, different types of beads can be extruded or deposited on a substrate. For example, foam beads or pellets can be released one at a time and disposed onto the substrate. In some embodiments, a bead can be released from a chute or hopper. In another embodiment, the bead can be deposited from a wheel, or other releasing device. In other embodiments, the beads can be pre-strung along the stitching thread, ribbon, or other continuous member, and then positioned in the desired location on the substrate.

Each bead can be placed onto the substrate in a precise manner, such that when the beads are cured or blown, they each expand within a certain predetermined dimension. In some exemplary embodiments, the beads are initially deposited in the unblown or uncured state to ensure they have certain uniform characteristics and the expansion properties are predictable. In other embodiments, however, the beads may be partially blown prior to being deposited on the substrate.

Once the bead has been deposited in the desired location, the bead can be stitched directly to the substrate. In some implementations, one or more of the beads can include an aperture or through-hole, which can facilitate the process of embroidering the bead to the substrate. For example, the bead can be deposited on the substrate, with the aperture or opening on one end of the bead, and a needle can be inserted directly into the opening to stitch the bead to the substrate. In some embodiments, a bead can be tipped onto its side after being stitched, such that the length of the bead extending between the two ends of the bead associated with the openings extend longitudinally rather than vertically.

Furthermore, in some cases, the beads may be pre-formed or somewhat pre-expanded, and have a softness sufficient to permit insertion of a stitch through the material of the bead. Thus, in some embodiments, beads may be stitched to the substrate without a pre-formed hole in the bead for receiving a securing fiber. Similarly, in some embodiments, the dimensions of the beads can be relatively thin and permit embroidery directly through the bead and to the substrate to keep the bead in place. In one embodiment, a bead may comprise dimensions of 4×6 mm. Other implementations may utilize beads that are smaller or larger than 4×6 mm. Once the bead is secured to the substrate, the next bead may be deposited and secured.

In some embodiments, substrate layer 4014 and/or securing fibers can comprise a material that dissolves after curing. For example, the substrate layer may include a PVA that dissolves or otherwise is removed during or after the curing process. Similarly, the securing fibers can include a TPU thread that can melt during the curing process and be joined to the fused bead material. In other embodiments, substrate layer and/or securing fibers can comprise a material that melts during the process of curing and merges to become part of the final structure. In another embodiment, substrate layer 4014 and/or securing fibers can at least partially remain intact and distinct from the surrounding foam. For example, in one embodiment, the securing fibers can provide a mesh or other type of supporting network that extends through the sole component, providing additional reinforcement to the structure. Thus, the mesh in some cases could be integrated/become monolithic with the resulting foam structure after processing, or may stay distinct to provide additional strength/tension.

Figure 6:
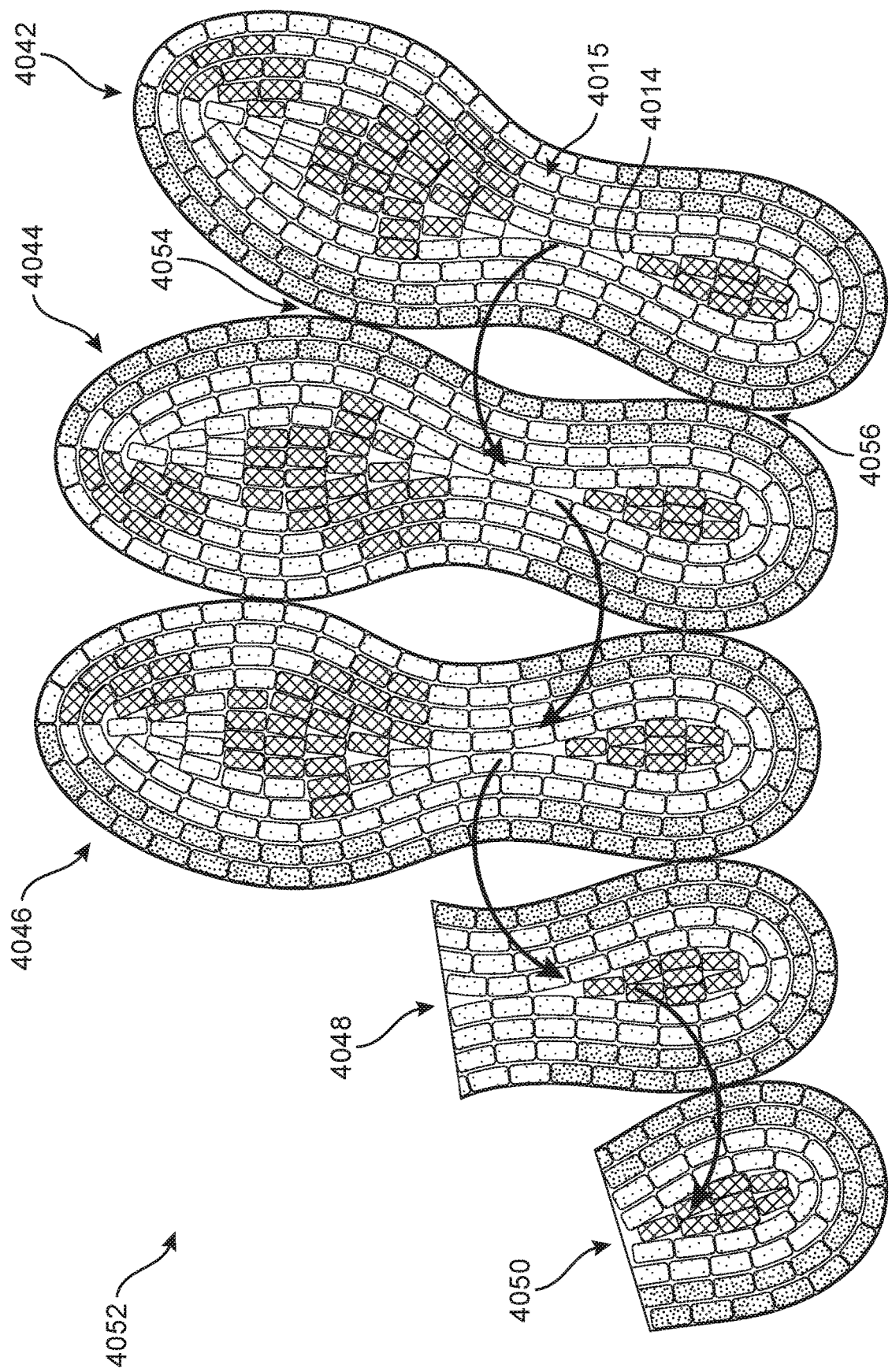
FIG. 6 is a schematic view of a multilayer assembly, according to an embodiment.
Figure 7:
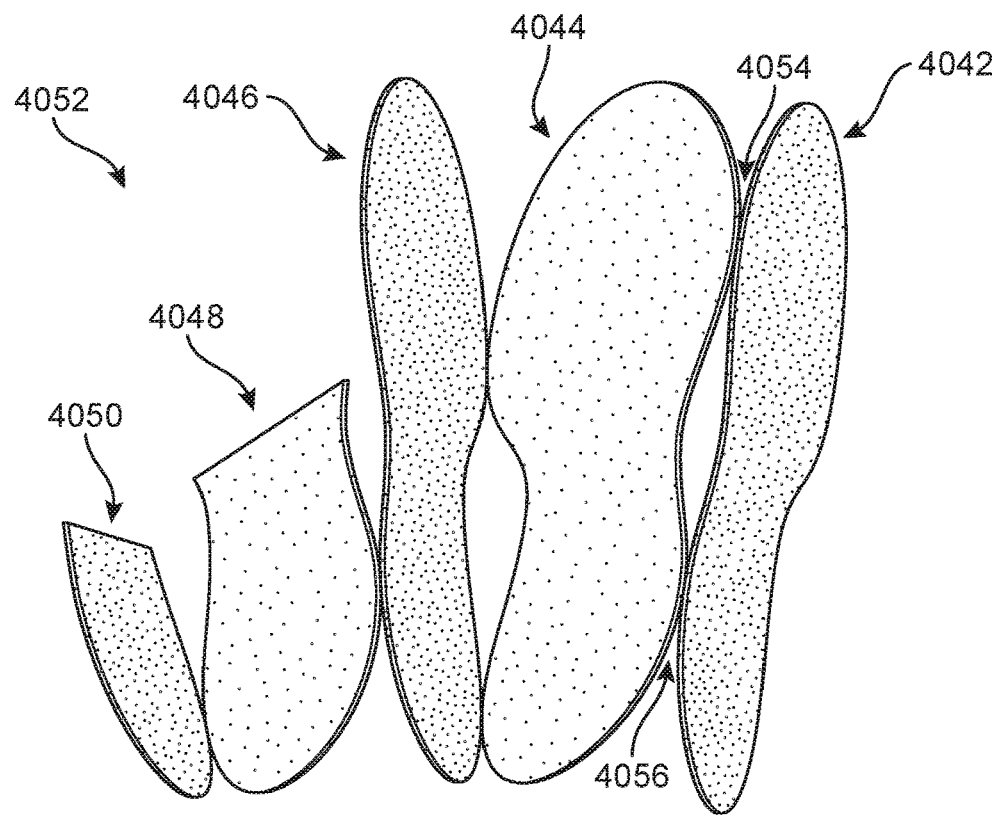
FIG. 7 is a schematic view of a plurality of a multilayer assembly being folded, according to an embodiment.

Furthermore, in different embodiments, two or more bead-substrate assemblies can also be stacked or assembled in a collection or pile to provide a multilayer bead-substrate assembly ("multilayer assembly"). Referring to FIG. 6, first assembly 4042, second assembly 4044, third assembly 4046, fourth assembly 4048, and fifth assembly 4050 are illustrated, comprising multi-layer assembly 4052. It can be seen that each assembly has a particular bead arrangement. In other words, the bead arrangement of first assembly 4042 differs from the bead arrangement of the other four assemblies. For purposes of this disclosure, bead arrangement refers to the pattern with which individual beads have been located on a substrate as well as the type of bead that was selected to be included in the pattern. Thus, two similarly shaped and sized substrates may have substantially similar patterns, but if different bead types are used in the two patterns, then the bead arrangement is understood to differ.

Figure 8:
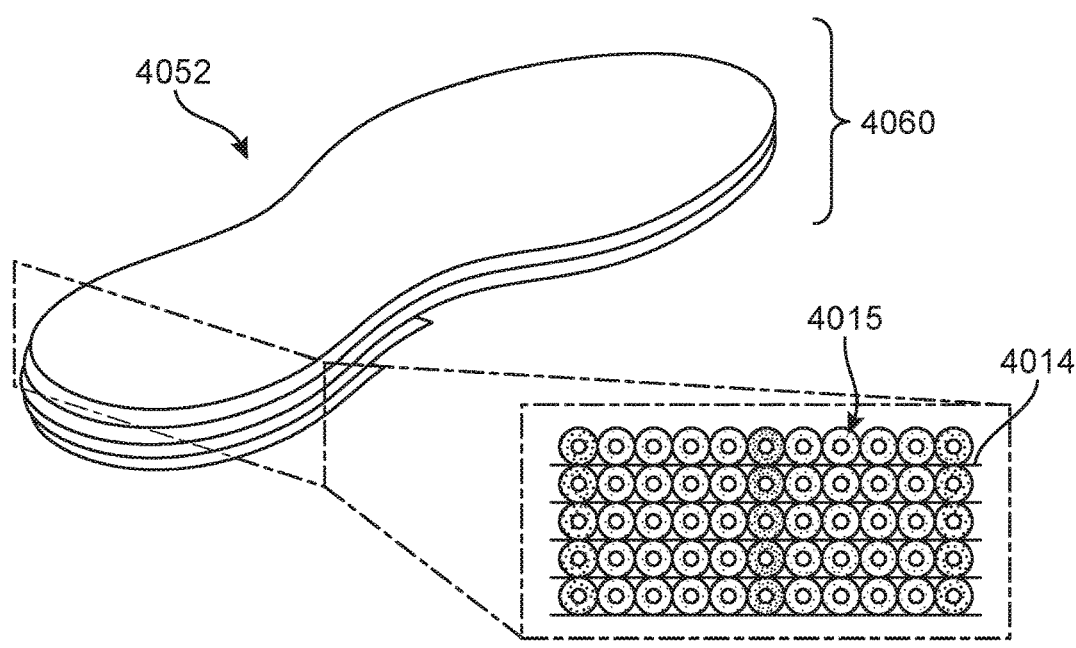
FIG. 8 is a schematic view of a multilayer assembly in a stacked formation, according to an embodiment.

In FIG. 6, multi-layer assembly 4052 is in an arrayed formation, such that each assembly is shown from a top-down or bottom-up perspective. Furthermore, it can be seen that in the implementation of FIG. 6, the individual assemblies of the multilayer assembly are linked in such a manner so as to allow an accordion dynamic or fanfold dynamic to the multilayer assembly. For example, first assembly 4042 is attached to second assembly 4044 along first anchor region 4054 and second anchor region 4056. In other embodiments, an assembly may be attached, linked, or otherwise secured to an adjacent assembly along only one point, or along additional points. The accordion-like arrangement is better understood with reference to FIG. 7, where multi-layer assembly 4052 is in the process of being folded, such that each assembly layer becomes stacked against the neighboring assembly, as shown in FIG. 8. It can be understood that with respect to bead substrate assemblies configured as soles for footwear, the accordion arrangement can alternate each of the bead-substrate assemblies such that one assembly is oriented in a lateral-medial direction and the adjacent assembly is oriented in a medial-lateral direction, and so forth. Thus, when the assemblies are stacked and form stacked assembly 4060, as shown in FIG. 8, the overall orientation of the three-dimensional structure is aligned along the medial-lateral axis. This process of fan folding can ensure that each of the layers and corresponding bead arrangements of stacked assembly 4060 are oriented correctly relative to one another when the stacking process occurs. After the multilayer assembly is stacked and the various beads are disposed adjacent to one another (across a single layer, along the horizontal plane) and above and/or below one another (across multiple layers, along the vertical plane), as depicted in the cross section of FIG. 8, the three-dimensional structure can be placed into a mold for curing.

Figure 9:
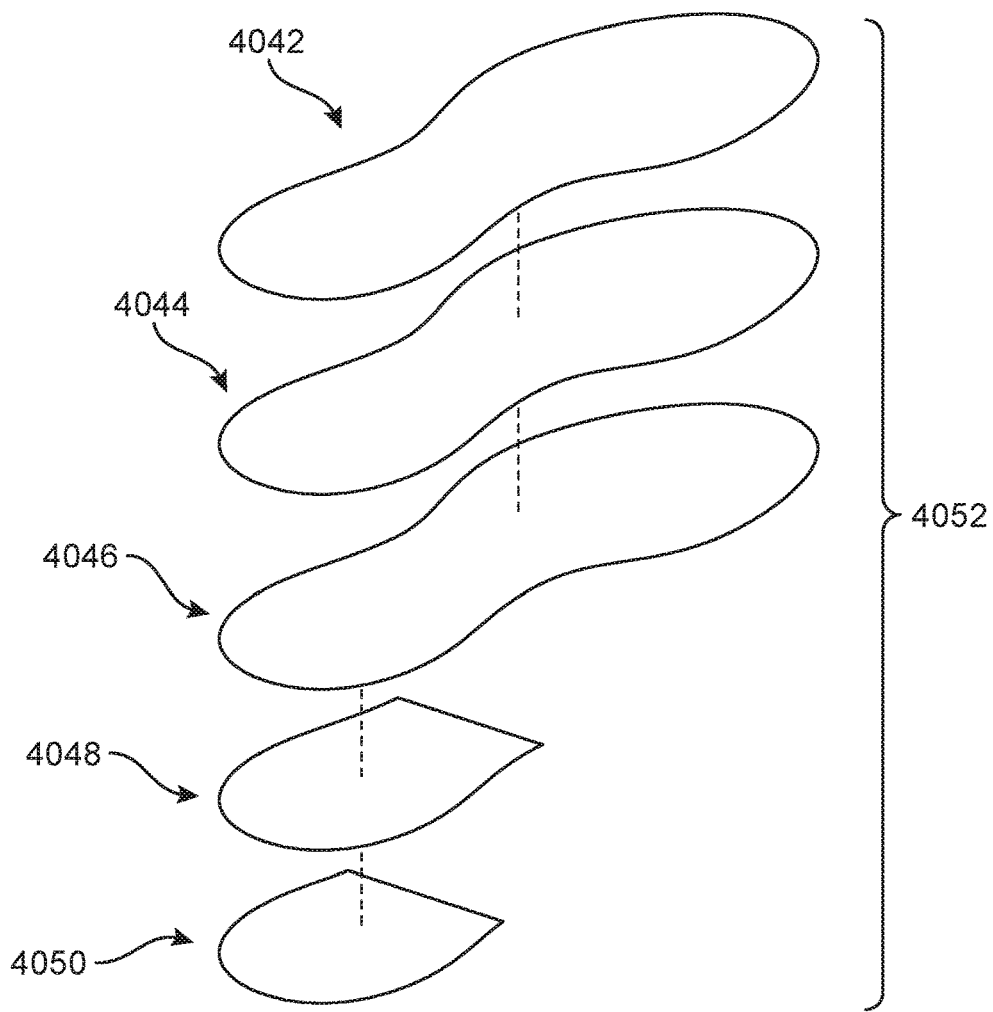
FIG. 9 is a schematic view of a plurality of multilayer assembly, according to an embodiment.
Figure 10:
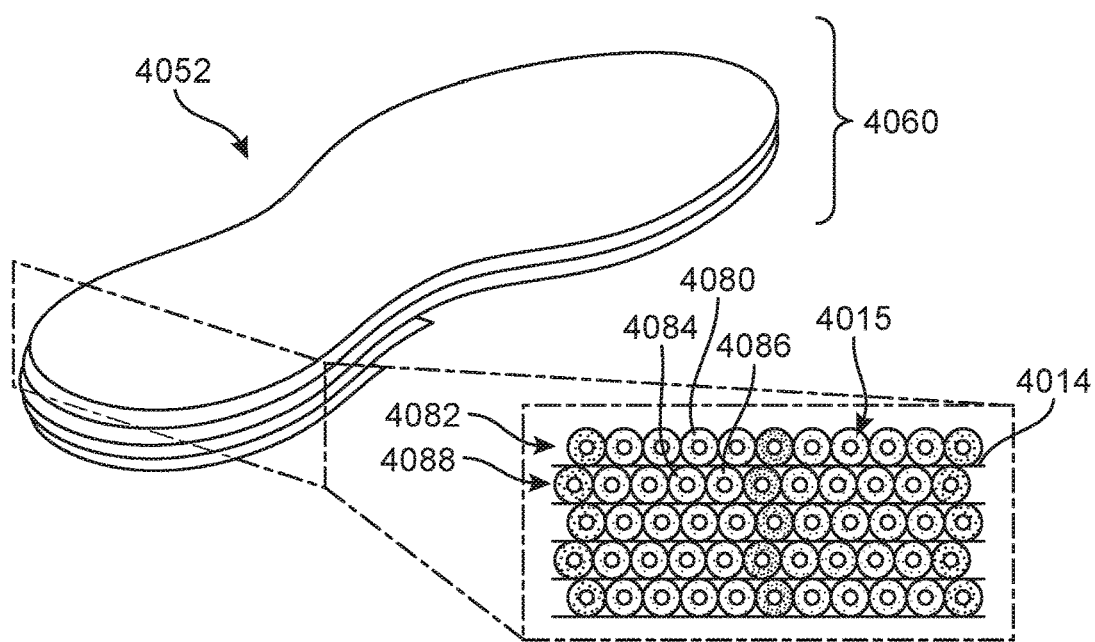
FIG. 10 is a schematic view of a plurality multilayer assembly in a stacked formation, according to an embodiment.

However, in other implementations, the individual layers comprising the multilayer assembly need not be attached to one another prior to curing. Referring to FIG. 9, each bead-substrate assembly can be individually produced as described earlier and then positioned one above the other. In other words, the stacking process need not be only a result of an accordion dynamic between each of the neighboring bead-substrate assemblies. Thus, as shown in FIG. 10, the individual (unlinked) bead-substrate assemblies can be stacked atop one another to form a three-dimensional structure where the various beads are disposed adjacent to one another (across a single layer, along the horizontal plane) and above and/or below one another (across multiple layers, along the vertical plane). Once stacked, the three-dimensional structure can be placed into a mold for curing. In some embodiments, the beads associated with each layer can be color-coded to align with other layers of the multi-layer assembly. For example, beads with a first cushioning level can be colored a first color, and beads with a second cushioning level can be colored a second color. Thus, as the layers are stacked, the various regions of cushioning can be noted or registered visually, and oriented to color-match each region.

FIG. 10 also illustrates another variation on the arrangement of beads between adjacent stacked layers. In contrast to the regular arrangement of beads shown in FIG. 8, FIG. 10 depicts an embodiment where beads in adjacent rows are staggered. For example, in FIG. 10, a first bead 4080 in a first row 4082 is disposed between second bead 4084 and third bead 4086 in a second row 4088, where "between" here is with respect to a horizontal or widthwise direction. In other embodiments, beads could be staggered in any other manner. In some cases, staggering beads may reduce the open spaces between beads in the stacked structure and reduce the tendency of air pockets to be formed in the final midsole structure.

Figure 11:
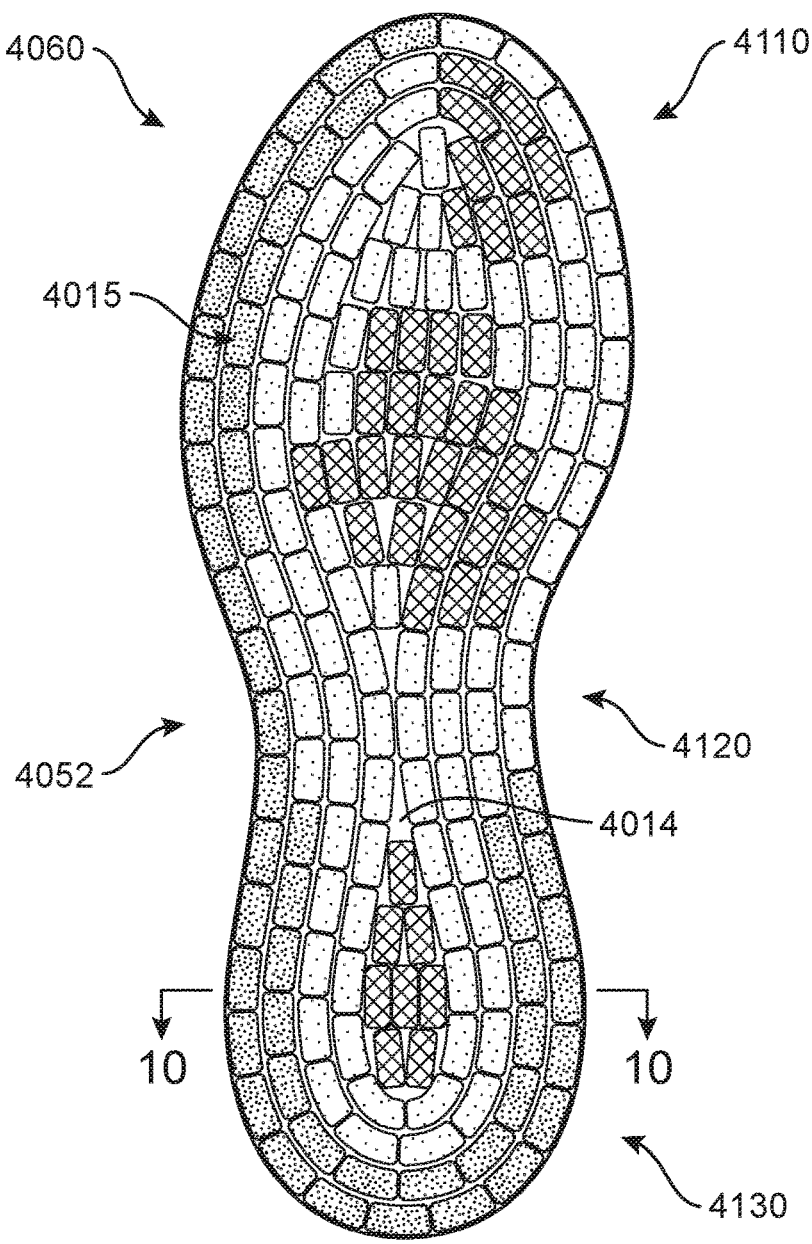
FIG. 11 is a schematic top-down view of a multilayer assembly stacked together, according to an embodiment.
Figure 12:
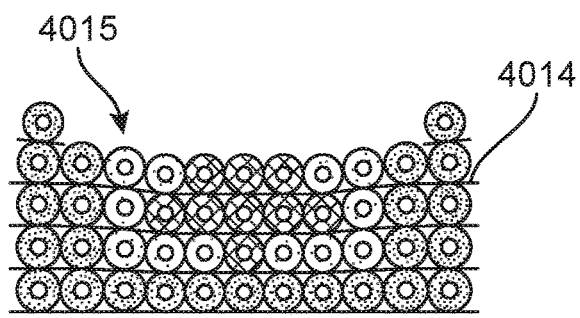
FIG. 12 is a schematic cross-sectional view of a multilayer assembly of FIG. 19, according to an embodiment.
Figure 13:
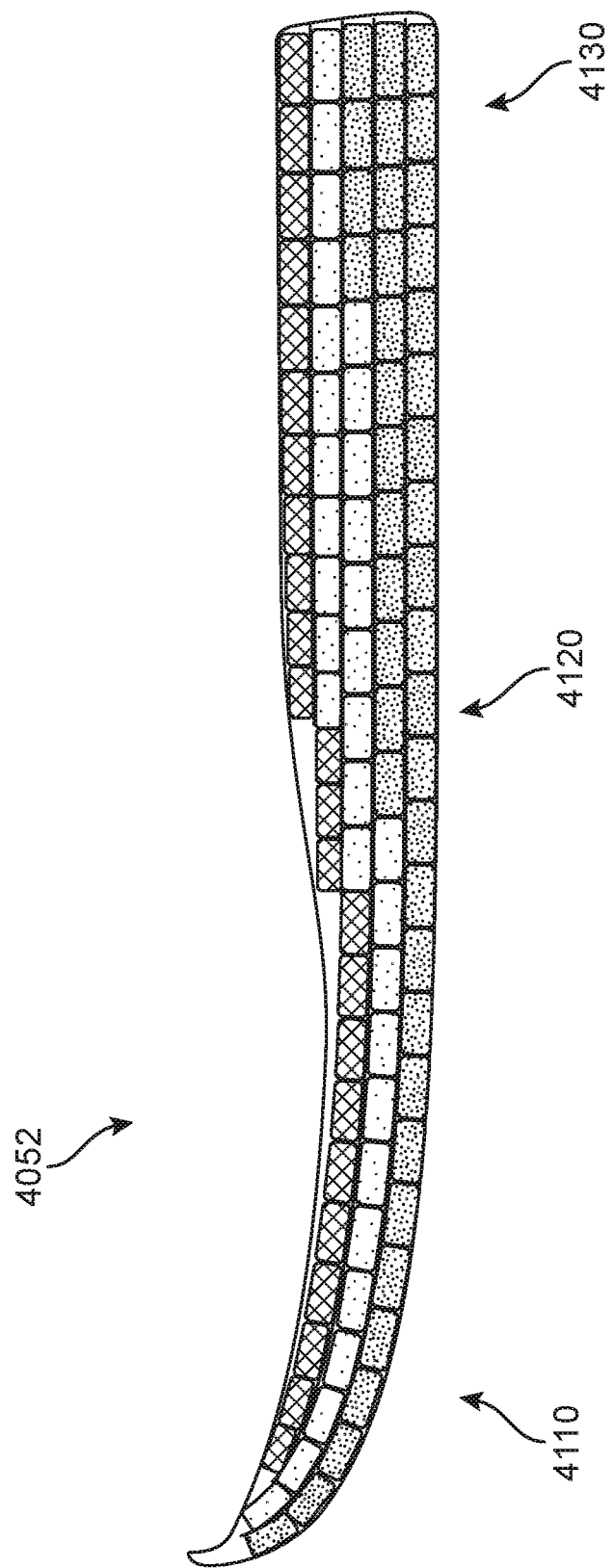
FIG. 13 is a schematic side view of a multilayer assembly stacked together, according to an embodiment.

Referring to FIG. 11, a top-down view of multi-layer assembly 4052 is shown, and in FIG. 12 a cross-sectional view of multi-layer assembly 4052 is provided. In addition, a side view of multi-layer assembly 4052 is shown in FIG. 13. In different embodiments, different regions of the three-dimensional structure may include different bead arrangements. For example, in some embodiments, each part of the sole member can be associated with a different number of bead-substrate assemblies. In the example of FIGS. 11 and 13, it can be seen that forefoot region 4110 has three layers, midfoot region 4120 has four layers, and heel region 4130 has five layers. Such a method can provide a gradated footwear component, with gradual changes in properties such as cushioning, reinforcement, support, and other such properties. This is also represented by FIGS. 6 and 9, where it is shown that different layers can include differently sized or dimensioned bead-substrate assemblies, so that when the assemblies are stacked into the multilayer assembly, some regions may have a greater thickness relative to other regions. In some embodiments, each layer can have a thickness of approximately 4 mm. In other embodiments, one or more layers can have a thickness of 1 mm to 4 mm. In another embodiment, a layer can have a thickness greater than 4 mm. The thickness of a bead-substrate assembly can also vary within a single layer. Thus, depending on the type of beads used in one region, one portion of the layer can be thicker than another portion of the same layer. For example, beads of greater expansion potential or size can be disposed in one region (e.g., the heel region) while beads with lesser expansion potential or size can be disposed in a second, different region (e.g., the forefoot region) along the same layer.

In different embodiments, additional bead types can be used that can more substantially affect the various structural properties and characteristics of the foam member. For example, in some implementations, "microbeads" or beads with significantly greater density, such as ceramic or acrylic beads, can be deposited onto the substrate and surrounded by other, softer beads, or alternatively, other softer materials, such as textiles or fabric. This can allow the manufacture of higher abrasion-resistance shoe regions, such as footwear for basketball or skateboarding, where uppers can maintain their sock-like feel, but include much more resilient materials throughout the foam. The inclusion of high-density beads into a material allows for increased abrasion resistance while retaining some flexibility for the region.

Furthermore, it should be understood that other implementations can include bead arrangements providing any type of pattern desired. For example, there may be a uniformity to the cushioning provided by the beads throughout the entirety of the sole member, or the forefoot region and midfoot region can be substantially similar while the heel region includes relatively greater rigidity or thickness. In other words, the properties of the sole member can be customized across a spectrum of properties, features, and dimensions. In one example, a sole member may be formed comprising a "frame" structure, where harder or more rigid beads are arranged along the perimeter while softer beads are located toward the central region of the same sole member (see the cross section of FIG. 11). Thus, a first user who is a "heel striker" can request the manufacture of a sole member with greater cushioning in the heel area, while another (second) user can request a more rigid heel region. Alternatively, the first user may over time desire a sole member with a more rigid heel, and request an update to the sole member in which there are more beads in the heel region that are harder than in the previously manufactured sole member. Such requests can also be associated with foot scans or pressure mapping, which can occur on-site with the manufacturing apparatus and materials, or can be submitted from a remote location to the manufacturer. Thus, a wide variety of materials or portions associated with an article of footwear such as midsoles, socklines, collars, ankle protectors, uppers, outsoles, tongues, braces, and other such components can be customized and manufactured using the disclosed methods, as well as materials for other articles of apparel. In addition, customization and changes to the bead arrangements can result from direct requests from a customer citing various personal preferences, and/or biomechanic feedback or data, the need for a particular directionality of movement (orientation of flexibility or regions of bending relative to regions or orientations of stiffness), and other such information.

In addition, as noted above, a single finishing mold can be used for manufacturing widely differing sole members. Thus, a first sole member with a first structural type (e.g., a first cushioning type in the heel region) and a second sole member with a second structural type (e.g., a second cushioning type in the heel region that is different from the first cushioning type) can be manufactured using the same mold. In other words, two or more sole members with differing internal structures can be produced through the same mold. Each sole member can be customized at the "voxel" level, where single beads with specific characteristics can be secured to the substrate to provide the desired properties in the desired regions of the sole member (or other articles of apparel). This method can provide significant benefits, including lowered production costs, less tooling, greater efficiency in the use of materials, less waste, rapid production time, greater portability, and easy customization. Because only one mold is needed, the manufacturing apparatus can be minimal, and may be readily made available in retail outlets, for example. Thus, a customer can be given access to a different type of customization process, where sole members can be manufactured, feedback can be submitted to the manufacturer, and new sole members can be produced using the same molds. The customization would be linked to the type and number of beads deposited in a specific voxel area, rather than through the mold. Once any portion of the bead arrangement is changed, the sole member will have a different material composition.

Figure 14:
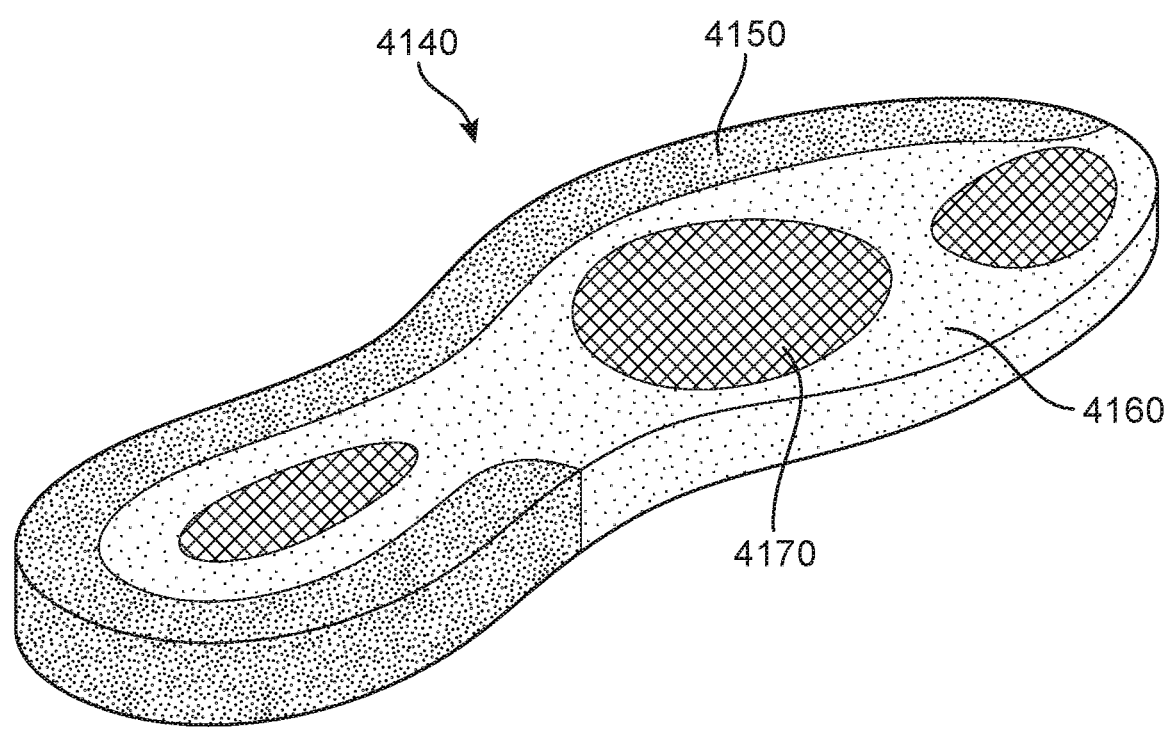
FIG. 14 is a schematic isometric view of the multilayer assembly fused together.

As noted above, once the multilayer assembly has been stacked and positioned within a mold, heat and/or pressure can be applied to the stacked multilayer assembly to activate and expand the beads. In FIG. 14, one example of a sole member is shown, in which the plurality of beads have been fused together, producing a unitary, solid, or continuous sole member 4140. As an illustration, the different bead types can be seen to have fused to form different regions associated with varying structural properties. Thus, the first bead type (see FIG. 5) has fused to form a continuous first region 4160, the second bead type (see FIG. 5) has fused to form a continuous second region 4170, and the third bead type (see FIG. 6) has fused to form a continuous third region 4150. It should be understood that FIG. 14 is for purposes of illustration only, and the various bead types can be intermingled, such that distinct bead type regions are not present, but rather a continuous blend or merged region of different beads is provided. In other words, the resultant foam member will have properties and regions dependent on the initial deposition arrangement of beads and the types of beads selected. In at least some embodiments, the resulting foam member is comprised of fused beads, with the continuous regions described above comprising various fused bead regions.

The methods described herein for making sole components could also be used to make other kinds of pads, cushioning elements, and/or foam elements that could be incorporated into soles, apparel, and/or equipment. As an example, in some embodiments, a shin guard could be constructed by forming multiple layers of embroidered beads that could be folded or stacked together to form a padded component for a shin guard. In some embodiments, multiple layers of embroidered beads could be formed in a fan-fold configuration similar to the configuration shown in FIG. 6 for constructing beaded soles. The layers could then be folded together to form a multilayered component.

In some embodiments, the layers can be constructed so that outer layers are formed using beads of a harder material while inner layers are formed using beads of a relatively softer material to promote cushioning. Once folded into a stacked arrangement, the beads in the embroidered layers could be exposed to heat and/or pressure to fuse the beads into a single component. Again, this process may be similar to the manner that the multiple layers of embroidered beads shown in FIG. 6 are folded and then heated to fuse the beads and form sole member 4140, which is shown in FIG. 14. In some embodiments, one or more kinds of foam beads could be used so that the resulting shin guard is made of foam.

Figure 17:
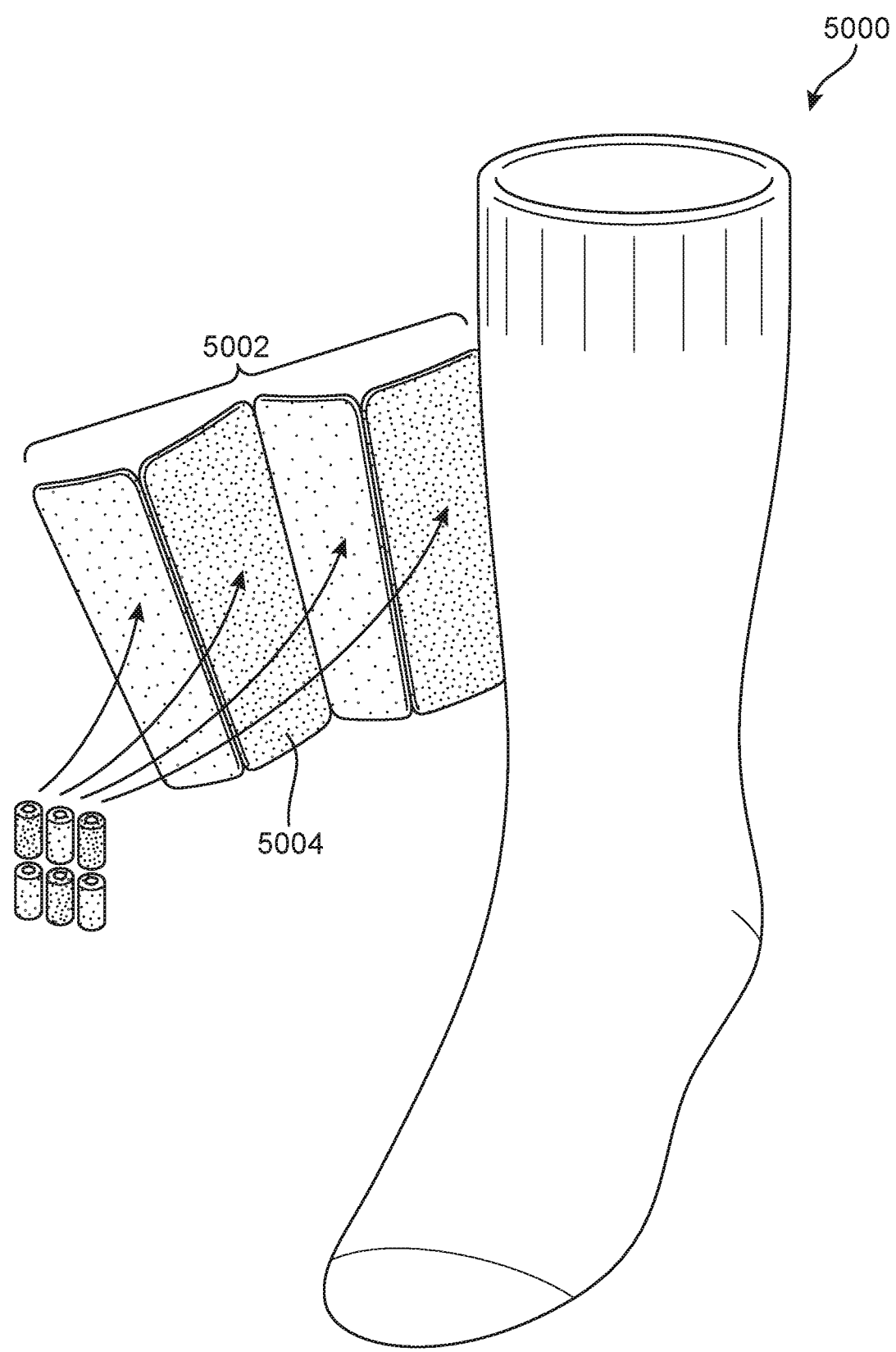
FIG. 17 is a schematic view of an embodiment of an article with a multilayer assembly.
Figure 18:
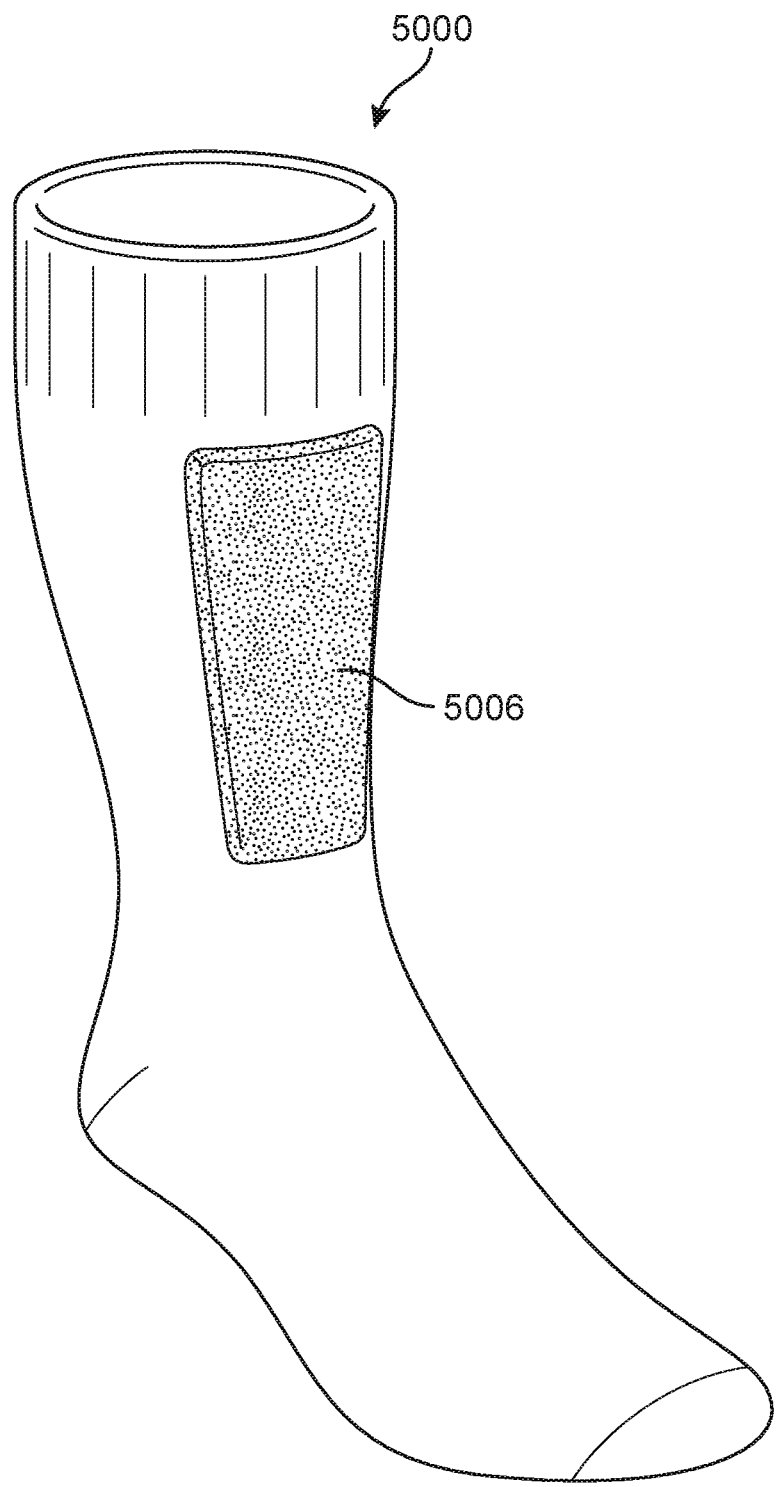
FIG. 18 is a schematic view of the article of FIG. 17 after the multilayer assembly has been folded together.

In some embodiments, the multiple embroidered layers could be formed integrally with the sock (i.e., the embroidered flaps could be integrally formed as the sock is being knitted or woven). An example of such a construction is shown in FIGS. 17 and 18. Specifically, article 5000 (i.e., a sock) may be manufactured with extending portion 5002 that may configured as multiple panels of material 5004. In some embodiments, beads (not shown) could be embroidered onto the panels of material 5004 to form multiple bead-substrate assemblies. These assemblies could then be folded and stitched together before or after processing the beads to form a solid foam component. Thus, as seen in FIG. 18, this process allows for efficiently manufacturing article 5000 with an integrated shin-guard 5006.

It may also be appreciated that this method of forming a shin guard using fan-folded layers (or other stacked layers) could be used to make any kinds of pads or cushioning elements for use in various kinds of articles. Moreover, the pads or cushioning elements could be separately formed and then attached (i.e., stitched) to an article, or could be integrally formed with the article as the article is made (e.g., to the sleeves, the elbows, etc. of a garment as the garment is knitted, woven, or otherwise made).

Figure 15:
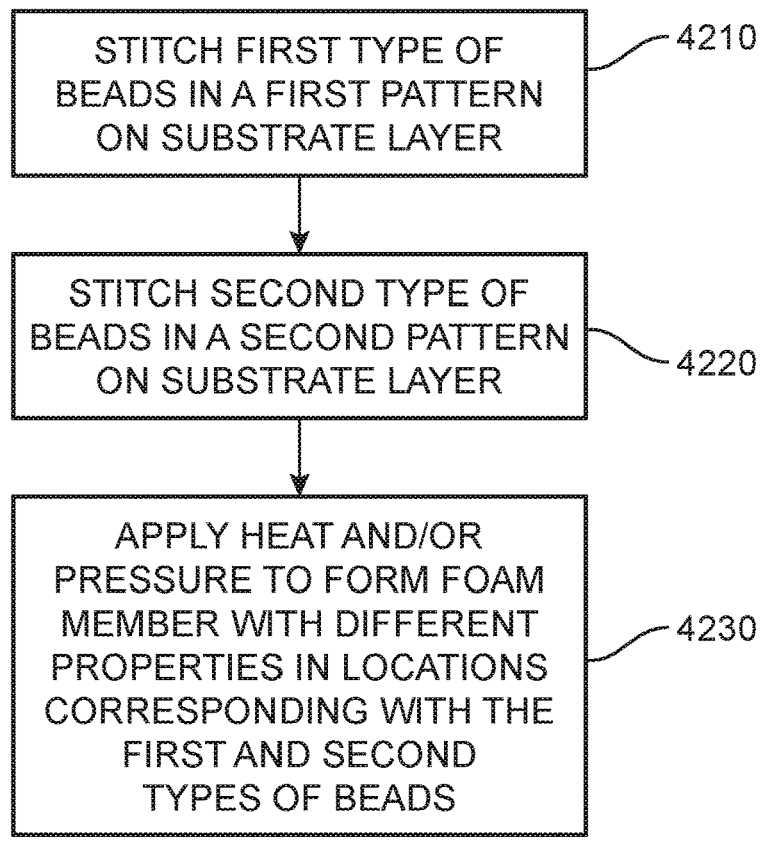
FIG. 15 is a flow chart depicting an embodiment of a method of making a foam member.

Referring now to the flow chart of FIG. 15, another method of making a type of foam structure is illustrated. In first step 4210, a plurality of a first type of bead is stitched in a first pattern to a substrate layer. In second step 4220, a plurality of a second type of bead is stitched in a second pattern to a substrate layer. Additional steps can include further substrate layers and beads being stitched together, and collecting or stacking the various layers together to form a multilayer assembly. In third step 4230, the bead-substrate assembly (or multilayer assembly) is exposed to heat and/or pressure in order to fuse together the plurality of beads and/or the substrate layer. The curing process forms a foam member with different properties in locations corresponding with the first bead type and the second bead type. Thus, as noted earlier, different portions of the sole member can comprise different properties through the use of different bead types in particular locations of the assembly.

Figure 16:
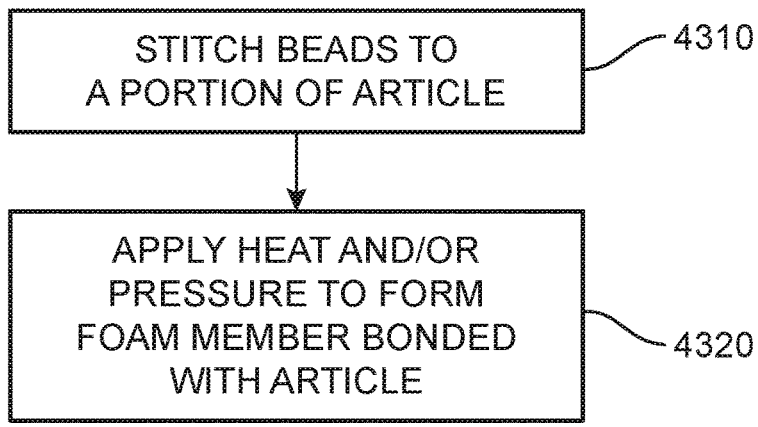
FIG. 16 is a flow chart depicting an embodiment of a method of making a foam member.

Referring to the flow chart of FIG. 16, another method of making a structure comprising a foam member as described above is illustrated. In first step 4310, a plurality of beads is stitched to a portion of an article of footwear. In second step 4320, the bead-substrate assembly (or multilayer assembly) is exposed to heat and/or pressure in order to fuse together the plurality of beads and form a foam member that is bonded to the article of footwear. For example, a pattern of beads may be deposited on a lower surface of an upper, an interior cavity of the upper, or a portion of the sole structure. When fused, the beads can provide a seamless, continuous foam member directly bonded to the upper or sole structure. In one implementation, a multilayer assembly could extend upward or outward and pattern the outer edges of an upper. For example, some of the layers comprising the sole member could include portions of bead substrate that extend up and around the medial or lateral (or forward-most or rear-most) side of the upper and be fused to bond directly to the upper.

Furthermore, embodiments can include provisions for customizing an article according to various user preferences, user measurements, or other custom parameters. Examples of user preferences include, but are not limited to, preferences for cushioning levels in an article, preferences for breathability in an article, preferences for comfort in an article as well as other kinds of preferences. Examples of custom measurements include, but are not limited to, foot measurements, foot pressure maps, as well as other kinds of custom measurements. Other kinds of custom parameters include the design of an article, including both aesthetic and functional characteristics of the article.

Figure 19:
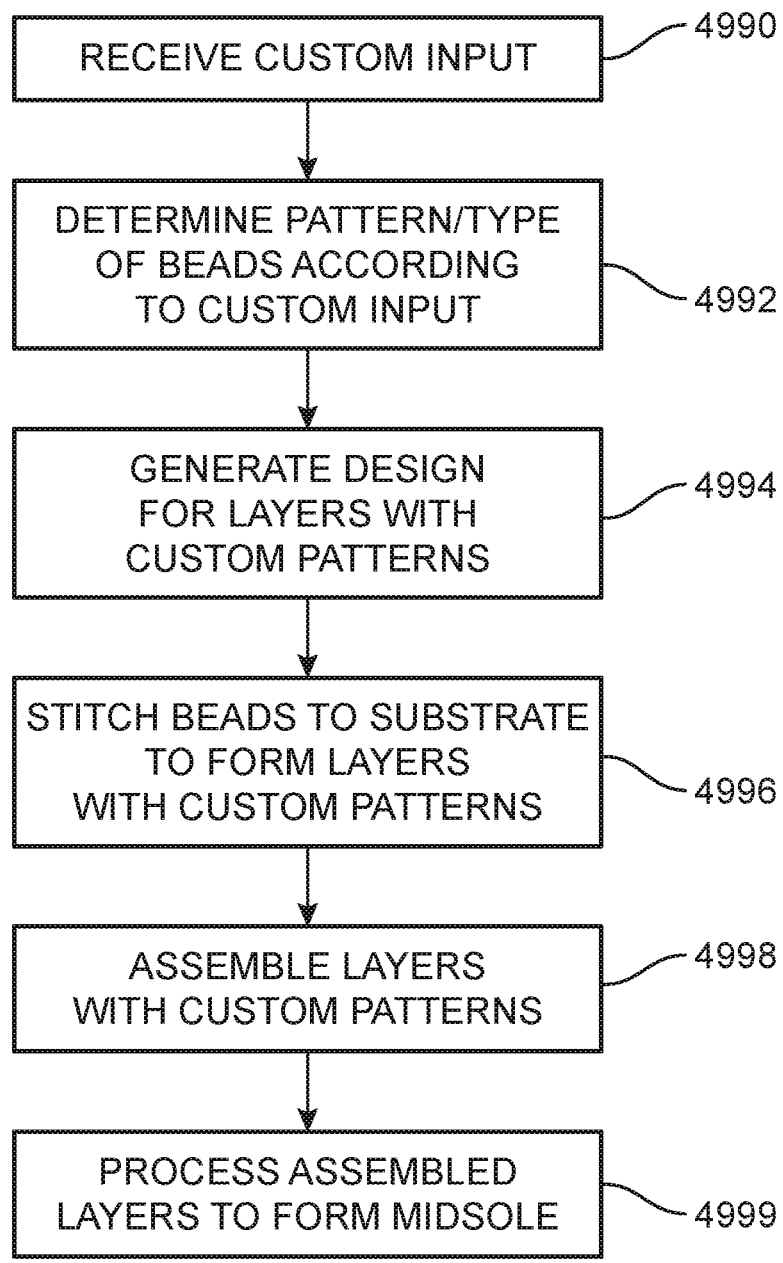
FIG. 19 is a schematic view of a process for making a customized article, according to an embodiment.

FIG. 19 is a schematic view of a process for creating a customized article using the various methods and systems discussed above, according to an embodiment. In first step 4990, information related to custom input is received. This information could be received from a variety of sources. Exemplary sources include, for example, foot pressure scanners, optical devices for sensing information about a foot or other part of the body (for a garment or other article), as well as other sources of information. In some embodiments, custom input information could be collected from forms (including online forms) where customers enter preferences or other kinds of custom information.

In second step 4992, the pattern and/or type of beads may be determined based on at least some of the custom input. As an example, if the custom input is a pressure map of a user's foot, the pattern and types of beads may be selected to achieve a cushioning profile that best matches the specific pressure map of the foot. In third step 4994, a design comprising multiple layers with customized patterns can be generated. In some cases, these designs may be created by a computer, for example. In some cases, these designs can be manually created by a worker. The customized patterns may specify the type and location of each bead in each layer.

Next, in step 4996 beads may be stitched to a substrate in a manner that forms the customized layers. Next, in step 4998 the layers could be assembled together (e.g., stacked or folded together as previously described). Finally, in step 4999, the assembly of customized layers can be processed (e.g., heated) to form a customized midsole with a density profile that is unique and determined by the custom input information received in step 4990.

It may be appreciated that these steps of customization can be used with any of the manufacturing methods described elsewhere in the present application. For example, this method could be used to provide customized abrasion-resistance regions on an article. This could be achieved by observing wear patterns in a user's articles and custom designing abrasion-resistance regions to be applied in the high wear regions. The abrasion-resistance region could be achieved by applying abrasion-resistant beads as described previously. As another example, this method could be used to provide customized cushioning in a midsole. This could be achieved by inputting a pressure map of a user's foot and designing a midsole with a unique cushioning profile according to the pressure map. The midsole could then be created using the methods described previously.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

The invention claimed is:

1. A customized midsole, comprising:
 a substrate layer;
 a plurality of fused beads sewn to the substrate layer using thread a securing fiber;
 the plurality of fused beads including a first set of fused beads and a second set of beads, wherein each fused bead of the first set of fused beads is substantially similar to each other and wherein each fused bead of the second set of fused beads is substantially similar to each other;
 wherein the plurality of fused beads are fused together to form a unitary structure;
 wherein the first set of fused beads and the second set of fused beads have different structural properties; and
 wherein the securing fiber remains at least partially intact and distinct from the plurality of fused beads within the customized midsole.

2. The customized midsole according to claim 1, wherein the midsole comprises a first region of fused beads sewn to the substrate layer and a second region of fused beads sewn to the substrate layer; and
 wherein a density of the first region of fused beads is different from a density of the second region of fused beads.

3. The customized midsole according to claim 2, wherein the first region of fused beads is disposed along an outer perimeter of the midsole, wherein the second region of fused beads is disposed inwardly of the first region of fused beads, and wherein the first region of fused beads is denser than the second region of fused beads.

4. The customized midsole according to claim 2, wherein the first region of fused beads is continuous with the second region of fused beads.

5. The customized midsole according to claim 1, wherein the plurality of fused beads are sewn onto the substrate layer in a pattern based on custom input information.

6. The customized midsole according to claim 5, wherein the custom input information is a pressure map of a user's foot.

7. The customized midsole according to claim 5, wherein the first set of fused beads and the second set of fused beads are selected based on a cushioning profile associated with the custom input information.

8. The customized midsole according to claim 5, wherein the plurality of fused beads forming the customized midsole is customizable at a voxel level corresponding to a single fused bead.

9. A sole member for an article of footwear, comprising:
 a plurality of fused beads;
 the plurality of fused beads including a first layer of fused beads sewn to a first substrate layer and a second layer of fused beads sewn to a second substrate layer separate from the first substrate layer;
 wherein the first substrate layer and the second substrate layer are disposed in a stacked arrangement such that the second layer of fused beads sewn to the second substrate layer is disposed above the first layer of fused beads sewn to the first substrate layer;
 wherein the first layer of fused beads and the second layer of fused beads are fused together to form a unified sole member; and wherein the first substrate layer and the second substrate layer remains at least partially intact and distinct from the first layer of fused beads and the second layer of fused beads within the unified sole member.

10. The sole member according to claim 9, wherein the first layer of fused beads includes at least one fused bead of a first type and at least one fused bead of a second type;
wherein the second layer of fused beads includes at least one fused bead of the first type and at least one fused bead of the second type, wherein the first type of fused bead and the second type of fused bead have different structural properties.

11. The sole member according to claim 10, wherein the at least one fused bead of the first type of the first layer and the at least one fused bead of the first type of the second layer are located in a first region of the sole member.

12. The sole member according to claim 11, wherein the at least one fused bead of the second type of the first layer and the at least one fused bead of the second type of the second layer are located in a second region of the sole member, wherein the second region is different than the first region.

13. The sole member according to claim 12, wherein the first type of fused bead and the second type of fused bead are selected based on custom input information associated with a user's foot.

14. The sole member according to claim 12, wherein the first region is disposed along an outer perimeter of the sole member;
wherein the second region is disposed inwardly of the first region; and
wherein the first type of fused bead is denser than the second type of fused bead.

15. The sole member according to claim 9, wherein at least one of the first substrate layer and the second substrate layer comprises a mesh; and
wherein the mesh provides reinforcement to the unified sole member.

16. A gradated footwear component, comprising:
a first plurality of fused beads sewn to a substrate layer with a securing fiber in a first region of the gradated footwear component, the first plurality of fused beads associated with a first bead arrangement on the substrate layer; and a second plurality of fused beads sewn to the substrate layer with a securing fiber in a second region of the gradated footwear component, the second plurality of fused beads associated with a second bead arrangement on the substrate layer; and
wherein the first plurality of fused beads and the second plurality of fused beads are fused together to form the gradated footwear component as a unitary structure such that at least one property of the gradated footwear component varies between the first region and the second region; and
wherein the securing fiber in the first region and the securing fiber in the second region remains at least partially intact and distinct from the first plurality of fused beads and the second plurality of fused beads within the gradated footwear component.

17. The gradated footwear component of claim 16, wherein the at least one property of the gradated footwear component is associated with cushioning; and
wherein the first bead arrangement is associated with a first thickness in the first region; and
wherein the second bead arrangement is associated with a second thickness in the second region, the second thickness being greater than the first thickness.

18. The gradated footwear component of claim 17, wherein the first bead arrangement includes a first number of layers of the first plurality of fused beads and the second bead arrangement includes a second number of layers of the second plurality of fused beads, the second number being greater than the first number.

19. The gradated footwear component of claim 17, wherein the first plurality of fused beads includes a first type of bead and the second plurality of fused beads includes a second type of bead; and
wherein the second type of bead has a greater expansion size than the first type of bead.

20. The gradated footwear component of claim 17, wherein the first bead arrangement and the second bead arrangement are selected based on a cushioning profile associated with custom input information of a user's foot.

* * * * *